United States Patent [19]

Okamura et al.

[11] Patent Number: 4,907,081
[45] Date of Patent: Mar. 6, 1990

[54] COMPRESSION AND CODING DEVICE FOR VIDEO SIGNALS

[75] Inventors: Fujio Okamura, Yokohama; Keizo Nishimura, Yokosuka; Shigemitsu Higuchi, Fujisawa; Takashi Furuhata, Yokohama, all of Japan

[73] Assignee: Hitachi, Ltd., Tokyo, Japan

[21] Appl. No.: 184,776

[22] Filed: Apr. 22, 1988

[30] Foreign Application Priority Data

Sep. 25, 1987 [JP] Japan .................... 62-238697

[51] Int. Cl.[4] .................................. H04N 7/02
[52] U.S. Cl. .................. 358/133; 358/135; 358/138
[58] Field of Search ........... 358/138, 133, 135, 136; 325/122, 27

[56] References Cited

U.S. PATENT DOCUMENTS 4,729,021  3/1988  Kondo ..................... 358/135
4,755,878  7/1988  Nakayama et al. ........ 358/136

OTHER PUBLICATIONS

"Processing of Digital Image Signals" Fukinuki; 6-84; Nikkan Kogho Shibun Co.

Primary Examiner—James J. Groody
Assistant Examiner—Victor R. Kostak
Attorney, Agent, or Firm—Antonelli, Terry & Wands

[57] ABSTRACT

A coding device in which N digital signals (time-sequential sampled data), obtained by sampling and quantizing analog video signals, are brought together in one group (N being an integer greater than two) and coded. Among these N sampled data, at least one of them serving as a reference is coded with a number of quantization bits n, which is so great that errors due to the quantization can be neglected, and for the other sampled data the difference between the reference sampled data and each of the others is compressed and coded with a number of bits, which is smaller than n. In this way, even if a coding error is produced; effects thereof are restricted within the group where it is produced they are not exerted on the other groups, and thus error propagation does not occur.

36 Claims, 30 Drawing Sheets

FIG. 5

| | | $F_{4i+1}$ | | | $F_{4i+5}$ | | | $F_{4i+9}$ | |
|---|---|---|---|---|---|---|---|---|---|
| o | $C_{4i-1}$ | $A_{4i}$ | $C_{4i+2}$ | $C_{4i+3}$ | $A_{4i+4}$ | $C_{4i+6}$ | $C_{4i+7}$ | $A_{4i+8}$ | |
| | | | | ←—— $4\tau$ ——→ | | | | | |
| p | $C_{4i-2}$ | | | $C_{4i+2}$ | | | $C_{4i+6}$ | | |
| q | $F_{4i-3}$ | | | $F_{4i+1}$ | | | $F_{4i+5}$ | | |
| r | $A_{4i-4}$ | | | $A_{4i}$ | | | $A_{4i+4}$ | | |
| s | $C_{4i-5}$ | | | $C_{4i-1}$ | | | $C_{4i+3}$ | | |
| t | $B_{4i-2}$ | | | $B_{4i+2}$ | | | $B_{4i+6}$ | | |
| u | $B_{4i-5}$ | | | $B_{4i-1}$ | | | $B_{4i+3}$ | | |
| v | $A_{4i-2}$ | | | $A_{4i+2}$ | | | $A_{4i+6}$ | | |
| w | $A_{4i-5}$ | | | $A_{4i-1}$ | | | $A_{4i+3}$ | | |
| x | $A_{4i-6}$ | | | $A_{4i-2}$ | | | $A_{4i+2}$ | | |
| y | $A_{4i-8}$ | | | $A_{4i-4}$ | | | $A_{4i}$ | | |
| z | $A_{4i-9}$ | | | $A_{4i-5}$ | | | $A_{4i-1}$ | | |
| $\alpha$ | $E_{4i-7}$ | | | $E_{4i-3}$ | | | $E_{4i+1}$ | | |
| $\beta$ | $D_{4i-7}$ | | | $D_{4i-3}$ | | | $D_{4i+1}$ | | |
| $\gamma$ | $A_{4i-7}$ | | | $A_{4i-3}$ | | | $A_{4i+1}$ | | |
| $\delta$ | $A_{4i-9}$ $A_{4i-8}$ $A_{4i-7}$ $A_{4i-6}$ $A_{4i-5}$ $A_{4i-4}$ $A_{4i-3}$ $A_{4i-2}$ $A_{4i-1}$ $A_{4i}$ $A_{4i+1}$ | | | | | | | | |

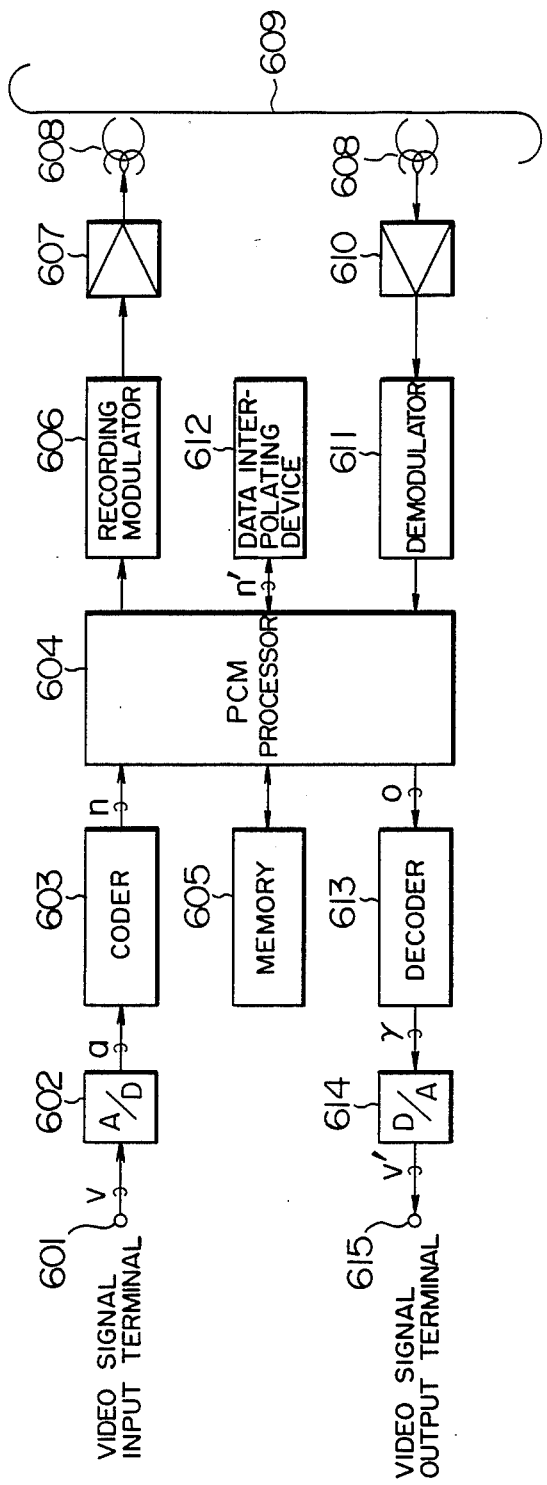

FIG. 8A

| n' | $C_{4i-5}$ | $C_{4i-2}$ | $A_{4i}$ | $F_{4i+1}$ | $C_{4i+3}$ | $C_{4i+6}$ |
|---|---|---|---|---|---|---|
| aa | WRITE AT ADDRESS X-1 | | | | WRITE AT ADDRESS X | |
| bb | | WRITE AT ADDRESS X-1 | | | | WRITE AT ADDRESS X |

FIG. 8B

| aa | READ OUT ADDRESS X-1 | | READ OUT ADDRESS X+2 FRAMES | READ OUT ADDRESS X | | |
|---|---|---|---|---|---|---|
| bb | READ OUT ADDRESS X-1+2 FRAMES | | READ OUT ADDRESS X | READ OUT ADDRESS X+2 FRAMES | | |
| o'' | $C_{4i-5}$ | $C_{4i-2}$ | $C'_{4i-1}$ | $C'_{4i+1}$ | $C_{4i+3}$ | $C_{4i+6}$ |
| o''' | | $F'_{4i-3}$ | $A_{4i}$ | $F_{4i+1}$ | | $A'_{4i+4}$ |
| o' | $C_{4i-5}$ | $A'_{4i-4}$ $C_{4i-2}$ $C'_{4i-1}$ | $A_{4i}$ | $F_{4i+1}$ $C'_{4i+2}$ $C_{4i+3}$ | $A'_{4i+4}$ | $F'_{4i+5}$ |

FIG. 13

| | | | | | | | | |
|---|---|---|---|---|---|---|---|---|
| $o^*$ | $C_{4i-1}$ | $A_{4i}$ | $C^*_{4i+2}$ | $C_{4i+3}$ | $A_{4i+4}$ | $C^*_{4i+6}$ | $C_{4i+7}$ | $A_{4i+8}$ | $C^*_{4i+10}$ |
| $p'$ | $C^*_{4i-2}$ ||| $C^*_{4i+2}$ ||| $C^*_{4i+6}$ |||
| $r'$ | $A_{4i-4}$ ||| $A_{4i}$ ||| $A_{4i+4}$ |||
| $s'$ | $C_{4i-5}$ ||| $C_{4i-1}$ ||| $C_{4i+3}$ |||
| $t'$ | $B_{4i-2}$ ||| $B_{4i+2}$ ||| $B_{4i+6}$ |||
| $u'$ | $B_{4i-5}$ ||| $B_{4i-1}$ ||| $B_{4i+3}$ |||
| $v'$ | $A_{4i-2}$ ||| $A_{4i+2}$ ||| $A_{4i+6}$ |||
| $w'$ | $A_{4i-5}$ ||| $A_{4i-1}$ ||| $A_{4i+3}$ |||
| $x'$ | $A_{4i-6}$ ||| $A_{4i-2}$ ||| $A_{4i+2}$ |||
| $y'$ | $A_{4i-8}$ ||| $A_{4i-4}$ ||| $A_{4i}$ |||
| $z'$ | $A_{4i-9}$ ||| $A_{4i-5}$ ||| $A_{4i-1}$ |||
| $a'$ | $A_{4i-7} = E_{4i-7}$ ||| $A_{4i-3} = E_{4i-3}$ ||| $A_{4i+1} = E_{4i+1}$ |||
| $\delta^*$ | $A_{4i-9}$ $A_{4i-8}$ $A_{4i-7}$ $A_{4i-6}$ | $A_{4i-5}$ $A_{4i-4}$ $A_{4i-3}$ | $A_{4i-2}$ | $A_{4i-1}$ | $A_{4i}$ | $A_{4i+1}$ || $A_{4i+2}$ |

FIG. 14A

| | $A_{3i-6}$ | $C_{3i-4}$ | $C_{3i-2}$ | $A_{3i}$ | $C_{3i+2}$ | $C_{3i+4}$ | $A_{3i+6}$ |
|---|---|---|---|---|---|---|---|
| n' | | | | | | | |
| aa | WRITE AT ADDRESS X-2 | WRITE AT ADDRESS X-1 | | WRITE AT ADDRESS X | | WRITE AT ADDRESS X+1 | |
| bb | | | | | | | |

FIG. 14B

| | | | | | | | READ OUT ADDRESS X+2 FRAMES | | | READ OUT ADDRESS X | | |
|---|---|---|---|---|---|---|---|---|---|---|---|---|
| aa | READ OUT ADDRESS X-2 | READ OUT ADDRESS X-1 | | | | | READ OUT ADDRESS X | | | READ OUT ADDRESS X+1 | | READ OUT ADDRESS X+1+2 FRAMES |
| bb | READ OUT ADDRESS X-2+2 FRAMES | | | READ OUT ADDRESS X-1+2 FRAMES | | | | | READ OUT ADDRESS X+1 | | | |
| o''' | $A_{3i-6}$ | $C_{3i-4}$ | $C_{3i-2}$ | | $A_{3i}$ | | $C_{3i+1}$ | $A'_{3i+3}$ | | $C_{3i+4}$ | $A_{3i+6}$ | |
| o'' | $C'_{3i-7}$ | $C'_{3i-5}$ | | $A'_{3i-3}$ | | $C'_{3i-1}$ | | | $C'_{3i+1}$ | | $C'_{3i+5}$ | $C'_{3i+7}$ |
| o' | $C'_{3i-7}$ | $A_{3i-6}$ | $C'_{3i-5}$ | $C_{3i-4}$ | $A'_{3i-3}$ | $C_{3i-2}$ | $C'_{3i-1}$ | $A_{3i}$ | $C'_{3i+1}$ | $C_{3i+2}$ | $A'_{3i+3}$ | $C_{3i+4}$ | $C'_{3i+5}$ | $A_{3i+6}$ |

F I G. 15
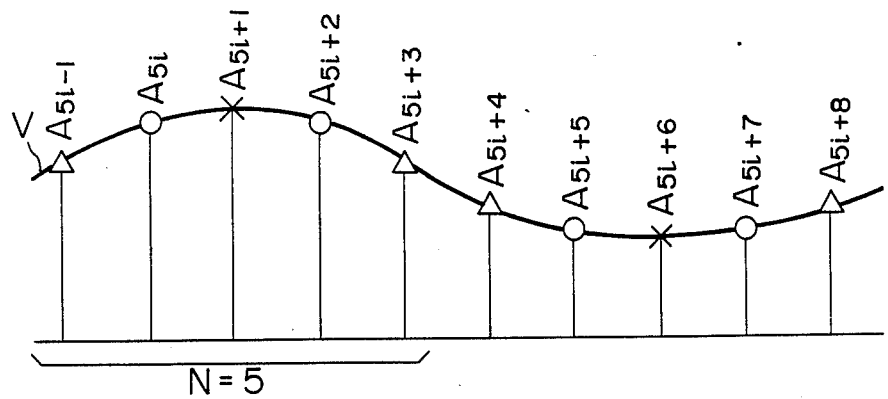
F I G. 16
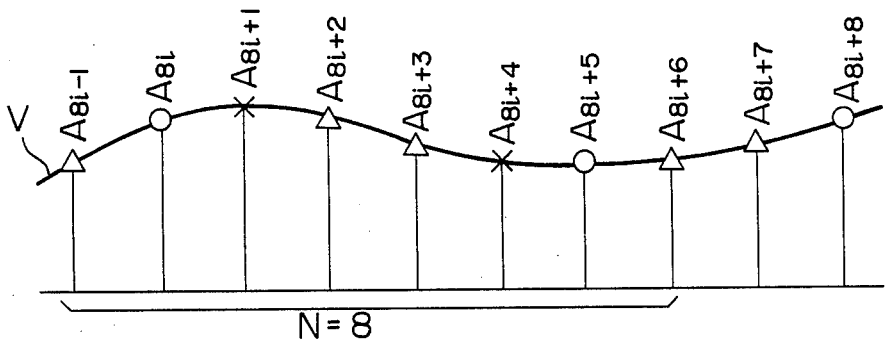
F I G. 17
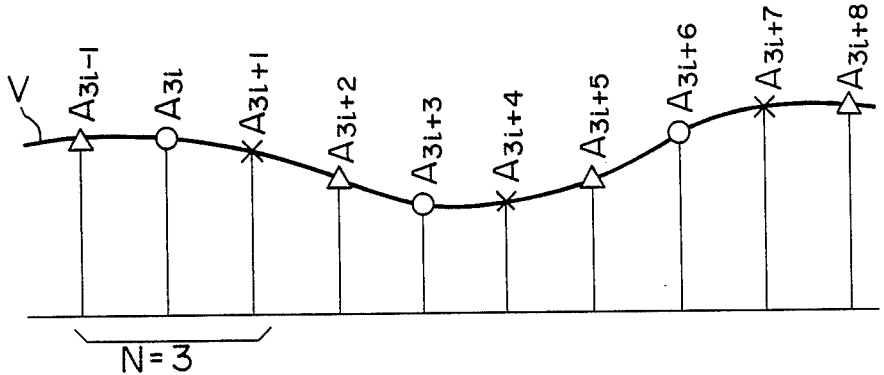

FIG. 24

| | ←τ→ | | | | | | | |
|---|---|---|---|---|---|---|---|---|
| a | ---|$A_{3i-1}$|$A_{3i}$|$A_{3i+1}$|$A_{3i+2}$|$A_{3i+3}$|$A_{3i+4}$|$A_{3i+5}$|----- |
| b | $A_{3i-3}$|$A_{3i-2}$|$A_{3i-1}$|$A_{3i}$|$A_{3i+1}$|$A_{3i+2}$|$A_{3i+3}$| |
| c | $A_{3i-4}$|$A_{3i-3}$|$A_{3i-2}$|$A_{3i-1}$|$A_{3i}$|$A_{3i+1}$|$A_{3i+2}$| |
| d | $A_{3i-5}$|$A_{3i-4}$|$A_{3i-3}$|$A_{3i-2}$|$A_{3i-1}$|$A_{3i}$|$A_{3i+1}$| |
| e | -------- | $A_{3i-2}$ | | | $A_{3i+1}$ | | | --- |
| f | -------- | $A_{3i-3}$ | | | $A_{3i}$ | | | --- |
| g | -------- | $A_{3i-4}$ | | | $A_{3i-1}$ | | | --- |
| h | -------- | $B'_{3i-2}\ (=A_{3i-3})$ | | | $B'_{3i+1}\ (=A_{3i})$ | | | --- |
| i | -------- | $B''_{3i-2}\ (=A_{3i-6})$ | | | $B''_{3i+1}\ (=A_{3i-3})$ | | | --- |
| j | -------- | $B'_{3i-4}\ (=A_{3i-3})$ | | | $B'_{3i-1}\ (=A_{3i})$ | | | --- |
| k | -------- | $B''_{3i-4}\ (=A_{3i})$ | | | $B''_{3i-1}\ (=A_{3i+3})$ | | | --- |
| ℓ | -------- | $B_{3i-2}$ | | | $B_{3i+1}$ | | | --- |
| m | -------- | $B_{3i-4}$ | | | $B_{3i-1}$ | | | --- |
| n | -------- | $C_{3i-2}$ | | | $C_{3i+1}$ | | | --- |
| o | -------- | $C_{3i-4}$ | | | $C_{3i-1}$ | | | --- |
| p | -------- | $D_{3i-2}$ | | | $D_{3i+1}$ | | | --- |
| q | -------- | $D_{3i-4}$ | | | $D_{3i-1}$ | | | --- |
| r | -------- | $A'_{3i-3}$ | | | $A'_{3i}$ | | | --- |
| s | -------- | $D_{3i-4}$ | $A'_{3i-3}$ | $D_{3i-2}$ | $D_{3i-1}$ | $A'_{3i}$ | $D_{3i+1}$ | --- |

FIG. 27

| | | | | | | | |
|---|---|---|---|---|---|---|---|
| | |←τ→| | | | | |
| s' | ---- | $A'_{3i}$ | $D_{3i+1}$ | $D_{3i+2}$ | $A'_{3i+3}$ | $D_{3i+4}$ | $D_{3i+5}$ | ----
| b' | ---- | $D_{3i-2}$ | $D_{3i-1}$ | $A'_{3i}$ | $D_{3i+1}$ | $D_{3i+2}$ | $A'_{3i+3}$ | ----
| c' | ---- | $A'_{3i-3}$ | $D_{3i-2}$ | $D_{3i-1}$ | $A'_{3i}$ | $D_{3i+1}$ | $D_{3i+2}$ | ----
| d' | ---- | $D_{3i-4}$ | $A'_{3i-3}$ | $D_{3i-2}$ | $D_{3i-1}$ | $A'_{3i}$ | $D_{3i+1}$ | ----

| | | | |
|---|---|---|---|
| e' | ------ | $D_{3i-2}$ | $D_{3i+1}$ | ----
| f' | ------ | $A_{3i-3}$ | $A_{3i}$ | ----
| g' | ------ | $D_{3i-4}$ | $D_{3i-1}$ | ----
| h' | ------ | $C'_{3i-2}$ | $C'_{3i+1}$ | ----
| i' | ------ | $C'_{3i-4}$ | $C'_{3i-1}$ | ----
| j' | ------ | $B'_{3i-2}\ (=A_{3i-3})$ | $B'_{3i+1}\ (=A_{3i})$ | ----
| k' | ------ | $B''_{3i-2}\ (=A_{3i-6})$ | $B''_{3i+1}\ (=A_{3i-6})$ | ----
| l' | ------ | $B'_{3i-4}\ (=A_{3i-3})$ | $B'_{3i-1}\ (=A_{3i})$ | ----
| m' | ------ | $B''_{3i-4}\ (=A_{3i})$ | $B''_{3i-1}\ (=A_{3i+3})$ | ----
| n' | ------ | $B_{3i-2}$ | $B_{3i+1}$ | ----
| o' | ------ | $B_{3i-4}$ | $B_{3i-1}$ | ----
| p' | ------ | $A'_{3i-2}$ | $A'_{3i+1}$ | ----
| q' | ------ | $A'_{3i-4}$ | $A'_{3i-1}$ | ----

| | | | | | | | |
|---|---|---|---|---|---|---|---|
| a' | ---- | $A'_{3i-4}$ | $A_{3i-3}$ | $A'_{3i-2}$ | $A'_{3i-1}$ | $A_{3i}$ | $A'_{3i+1}$ | ----

FIG. 29

| | | $\leftarrow 3\tau \rightarrow$ | | |
|---|---|---|---|---|
| e | ------- | $A_{3i-2}$ | $A_{3i+1}$ | --- |
| g | ------- | $A_{3i-4}$ | $A_{3i-1}$ | --- |
| h | ------- | $B'_{3i-2}$ ($=A_{3i-3}$) | $B'_{3i+1}$ ($=A_{3i}$) | --- |
| i | ------- | $B''_{3i-2}$ ($=A_{3i-6}$) | $B''_{3i+1}$ ($=A_{3i-3}$) | --- |
| j | ------- | $B'_{3i-4}$ ($=A_{3i-3}$) | $B'_{3i-1}$ ($=A_{3i}$) | --- |
| k | ------- | $B''_{3i-4}$ ($=A_{3i}$) | $B''_{3i-1}$ ($=A_{3i+3}$) | --- |
| w | ------- | $C'_{3i-2}$ | $C'_{3i+1}$ | --- |
| w' | ------- | $C''_{3i-2}$ | $C''_{3i+1}$ | --- |
| e' | ------- | $A'_{3i-2}$ | $A'_{3i+1}$ | --- |
| x | ------- | $C'''_{3i-2}$ | $C'''_{3i+1}$ | --- |
| x' | ------- | $C''''_{3i-2}$ | $C''''_{3i+1}$ | --- |
| e'' | ------- | $A''_{3i-2}$ | $A''_{3i+1}$ | --- |
| y | ------- | $C'_{3i-4}$ | $C'_{3i-1}$ | --- |
| y' | ------- | $C''_{3i-4}$ | $C''_{3i-1}$ | --- |
| g' | ------- | $A'_{3i-4}$ | $A'_{3i-1}$ | --- |
| z | ------- | $C'''_{3i-4}$ | $C'''_{3i-1}$ | --- |
| z' | ------- | $C''''_{3i-4}$ | $C''''_{3i-1}$ | --- |
| g'' | ------- | $A''_{3i-4}$ | $A''_{3i-1}$ | --- |
| $\ell$ | ------- | $B_{3i-2}$ | $B_{3i+1}$ | --- |
| m | ------- | $B_{3i-4}$ | $B_{3i-1}$ | --- |

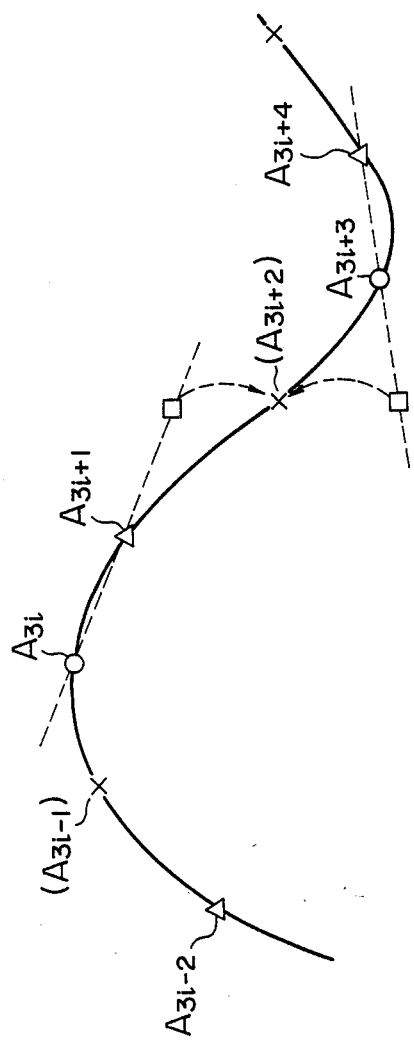
F I G. 32

COMPRESSION AND CODING DEVICE FOR VIDEO SIGNALS

BACKGROUND OF THE INVENTION

This invention relates to a coding device for transmitting digital signals (time-sequential sampled data) obtained by sampling and quantizing analogue video signals in the form of coded signals after having reduced the number of quantized bits per group of sample data.

In the case where analogue video signals (image signals) are transmitted as digital signals which have been obtained by sampling and quantizing the analogue signals, usually seven or eight bits are believed necessary for linear quantization as the number of quantization bits per group of sample data (which may be called below also "image data"). When the image signals are digitized by this linear quantization, a transmission rate of about 100 Mbps of digital signals is necessary for signals according to the standard television system, and as to signals according to a high quality television system which has been proposed, a transmission rate which is more than twice as high as that stated above is required.

In a device for recording/reproducing magnetically the transmitted image, signals described above in the form of digital signals (hereinbelow called digital VTR), since the transmission rate is extremely high, the recording density on a tape is substantially lowered with respect to that obtained by a conventional VTR according to the analogue recording system, and therefore satisfactory recording time cannot be obtained. Further, the frequency band of the signals being dealt with is very wide, and the working speed of the digital signal processing circuit also presents a problem, giving rise to technical difficulties and a serious obstacle to wide spread acceptance of this digital VTR for home use, etc.

In order to resolve this problem, heretofore a so-called high efficiency coding method (by which image data to be transmitted are reduced by coding them so as to lower the transmission rate) has been studied. An example thereof is described in detail in an article "Processing of image digital signals" (in Japanese) by Takahiko FUKINUKE, publishdd by Nikkan Kogyo Shimbunsha (Daily Industrial Newspaper Publishing Co.).

As described in this literature (Chapter 9) a so-called differential pulse code modulation (DPCM) has been proposed and is widely known as a method for reducing the number of bits necessary per pixel data. By this method, the value of a particular pixel at any moment is predicted o the basis of values of pixels which have been already coded, and the necessary number of bits is reduced by coding the difference (error) between the predicted value and the value of the particular pixel at that moment.

According to this differential pulse code modulation, it is possible to reduce the number of bits per pixel to about four or five, which is about one half of that required according to the linear quantization method.

However the DPCM method described above has a problem which should be resolved that influences of a coding error in a transmission system propagate on other codes one after another (so-called error propagation). Further, since the feedback formality is adopted in general for the differential pulse code modulation, quantization noise is fed back and has influences on following pixels, or vibratory noise called leak contour pattern is produced, which gives rise to gradations, fluctuations, etc. of the image contour portion, deteriorates extremely the image quality and so forth. Particularly, for devices in which a high image quality is required, it was difficult to adopt the conventional DPCM method as described above and to put it to practical use.

SUMMARY OF THE INVENTION

The object of this invention is, in view of the prior art techniques described above, to provide a coding device capable of suppressing signal deterioration (error propagation, etc.) accompanying the coding to a minimum and in addition capable of reducing the necessary average number of bits per sampled data.

According to this invention, in order to achieve the above object, the following measures are taken.

N digital signals (time-sequentially sampled data) obtained by sampling and quantizing analogue video signals are brought together in one group (N being an integer greater than 2) and coded. Among these N sampled data, at least one, which serves as a reference, is coded with a number of quantization bits n, which is so great that errors due to the quantization can be neglected, and for the other sampled data the difference between the reference sampled data and each of them is compressed and coded with a number of bits, which is smaller than n. In this way, even if a coding error is produced, influences thereof are restricted within the group, where it is produced, and they are not exerted on the other groups. Consequently error propagation doesn't occur.

According to one mode of implementing this invention, in a coding device, in which each of the groups obtained by dividing sampled data so that each group consists of N sampled data, is compressed and coded, image signals are transmitted while thinning out a part of the N sampled data stated above for every line so that they ar not overlapped on each other among M lines of the image signals having a relatively great image correlation within the same field, between different fields, between different frames, etc., and all the N sampled data are apparently transmitted by interpolating the thinned sampled data among these M lines by using the image correlation.

Or, among N sampled data (N is an integer greater than 3) of the video signals, at least one serves as the reference sampled data having n bits; at least one is not coded (i.e. not transmitted); and the remaining sampled data are compressed and coded by coding the difference between the sampled data and the predicted value based on the reference sampled data with a number of bits, which is smaller than n. In this way decoding is achieved also by calculating the sampled data, which are not coded, by interpolation, using the other coded and transmitted sampled data.

Furthermore, these two processes can be combined, so that among N sampled data (N is an integer greater than 3) of the video signals, at least one serves as the reference sampled data having n bits; at least one is not coded; and for the remaining sampled data the difference between each of the sampled data and the predicted value based on the reference sample data is compressed and coded with a number of bits, which is smaller than n. After that, a part of the N sampled data thus coded, which are not overlapped on each other among M lines of the image signals having a relatively great image correlation within the same field, between different fields, between different frames, etc., are transmitted for every line and interpolated by using the image correlation, and the sampled data which are not coded are interpolated by calculation on the basis of the remaining coded sampled data. In this way the number of bits is significantly reduced.

Further coding, by which decoding errors are small with a small number of bits and deterioration in the image quality is slight, can be achieved, when the optimum interpolation calculation method producing small errors is previously obtained by a method, by which errors between a plurality of kinds of interpolated values and the reference sampled data are obtained at the coding for the sampled data, which are not coded, etc. and a flag signal indicating them is transmitted.

Next, among N sampled data one is selected as the reference data, and for each of the remaining sampled data a plurality of predicted values are formed. Thereafter, one of them is selected. The remaining sampled data are coded on the basis of differential data between the selected predicted value and the others and compressed into data having a number of bits m, which is smaller than the number of bits n of the reference data previously described, which are transmitted (or recorded).

In the case of the television signal of NTSC system 2, predicted values are formed for each of the remaining sampled data. Hereinbelow, the reason therefor will be explained. When the frequency of the color subcarrier is designated by $f_{sc}$, a method may be utilized by which the sampling is effected with a sampling frequency of 4 $f_{sc}$; the value of the pixel preceding a relevant pixel by 4 pixels, which are in phase in the color subcarrier, is adopted as a predicted value (first predicted value); and the value of the adjacent pixel is adopted as another predicted value (second predicted value). Within the same image pattern the correlation is higher when the first predicted value is adopted than when the second predicted value is adopted, because the first is in phase with the color subcarrier. Consequently, the differential data therefor are small, and thus the former is more advantageous from the point of view that the necessary number of bits can be reduced by coding.

However, in the case where the pixel preceding the relevant pixel by 4 pixels exists beyond an edge portion of the image pattern, since the first predicted value has no correlation, in such a case it is more advantageous to adopt the second predicted value, which is the value of the adjacent pixel.

In this way two predicted values are formed for each of the remaining sampled data and the value which is more advantageous between them is adopted. This is the reason why two predicted value are formed. The value which is more advantageous can be known by forming differential data for every predicted value and comparing them. That is, it is sufficient to adopt the predicted value, whose differential data are smaller.

Although the outline of this invention has been explained in the above, this invention will be explained again below by using another expression. That is, in order to achieve the above object, according to this invention, at least one sample is coded with a number of quantization bits n, which is so great that quantization errors can be neglected, for every N (N is an integer greater than 2) samples of the video signals to be transmitted, and transmitted or recorded, the sample being the reference. For the remaining samples a plurality of predicted values, each of which corresponds to each of the remaining samples, are calculated on the basis of the reference sample. The remaining samples are transformed into data of a number of bits m, which is smaller than the number of bits n described above, on the basis of differential data between each of the predicted values and the reference sample.

The data of the number of bits m, obtained by using the predicted values, are extended and transformed into data of a number of bits, which is equal to that of the differential data, on the basis of the data by means of transforming means equivalent to that used at the coding, and each of the predicted values stated above corresponding to each of the extended and transformed data is added thereto. That is, at the coding, provisional decoding is effected. Next a predicted value is selected, which can give provisionally decoded data, for which the level differences between each of the added data of the number of bits n, which is the provisionally decoded data, and the original sample data are the smallest, by comparing their levels.

On the other hand, for the remaining samples the difference between the selected predicted value and each sample is compressed and coded.

According to this invention no accumulation of quantization errors due to the differential pulse code modulation occurs owing to the fact that for N samples a reference sample and compressed samples, for which the difference between the reference sample and each of the predicted values is quantized, are coded. Further, error propagation due to coding errors produced on a transmission path are prevented from continuing over a long period of time, and in this way it is possible to suppress deterioration of the image quality to the minimum.

Furthermore, according to this invention, since the coder can be constructed in the feed forward formalism, it is possible to remove the noise production described previously, which gave rise to a problem in the prior feedback type coder.

On the other hand it is possible to reduce remarkably the average number of bits per pixel by thinning out sampled data so that they are not overlapped between different lines and transmitting the N sampled data for every M image signal lines having a great image correlation. The thinned out sampled data can be obtained by interpolation using other lines among the M image signal lines. Further, it is possible to reduce the average number of bits per pixel also by the fact that a part of the N sampled data are neither coded nor transmitted, and it is obtained by interpolation using a value calculated on the basis of the other coded and transmitted sampled data among the N sample data. In this way decoding including small errors with a small number of bits is possible, because for this interpolated value, a plurality of interpolation calculation methods are previously determined; interpolation errors according to each of these methods are obtained at the coding; a flag indicating which method gives the smallest errors is transmitted; and the optimum interpolation method can be determined at the decoding, referring to the flag stated above. Furthermore, a remarkable decrease in the number of bits can be obtained by combining the thinning out of sampled data for every M image signal lines and the method by which interpolation is effected in the N sample data.

On the other hand, errors produced by the compression and extension can be kept to a minimum by calculating a plurality of predicted values for the samples to be compressed and coded; provisionally decoding them by using each of these predicted values at the coding; selecting a predicted value giving the provisionally decoded data, for which the level difference between the predicted value and the original sample data is the smallest, and compressing and coding the difference between this selected predicted value and the reference sampled data.

BRIEF DESCRIPTION OF THE DRAWINGS

FIG. 5 is a timing chart for explaining the work of the decoding device indicated in FIG. 4;

FIG. 6 is a block diagram of an example to which this invention is applied;

FIGS. 8A and 8B are timing charts for explaining the operation of the device indicated in FIG. 7;

FIG. 13 is a timing chart for explaining the operation of the device indicated in FIG. 12;

FIGS. 14A and 14B are timing charts for explaining still another embodiment of the coding device according to this invention;

FIGS. 15 to 21 are diagrams illustrating examples of the structure of various samples coded by the coding device according to this invention;

FIG. 24 is a timing chart for explaining the work of the device indicated in FIG. 23;

FIG. 27 shows the timing of signals in various parts of the circuit indicated in FIG. 26;

FIG. 29 shows the timing of signals in various parts of the circuit indicated in FIG. 28 for the purpose of explaining the operation thereof;

FIG. 32 shows a waveform for explaining the principle of operation of another embodiment of this invention.

DESCRIPTION OF THE PREFERRED EMBODIMENTS

Figure 1:
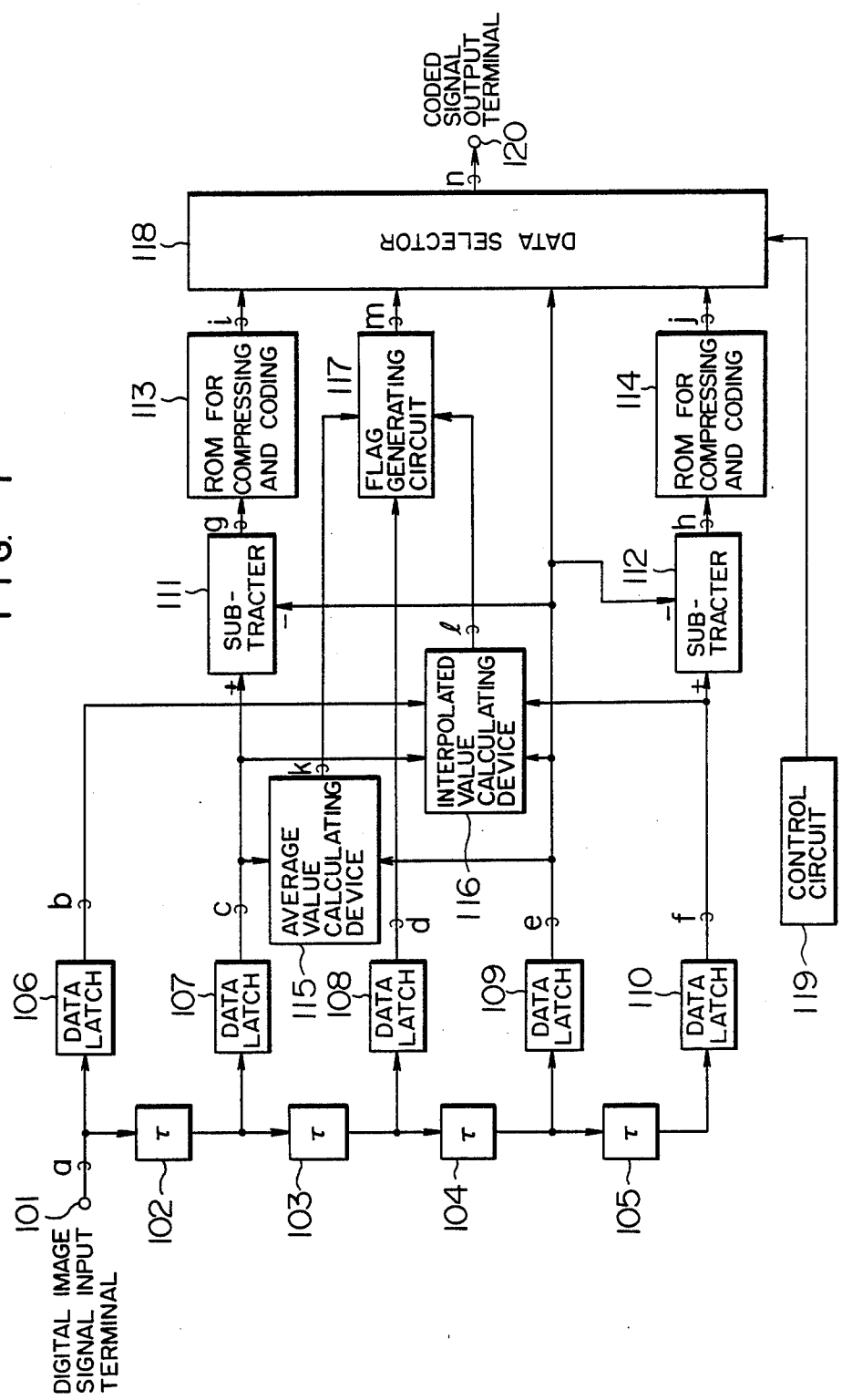
FIG. 1 is a block diagram illustrating an embodiment of the coding device according to this invention.
Figure 2:
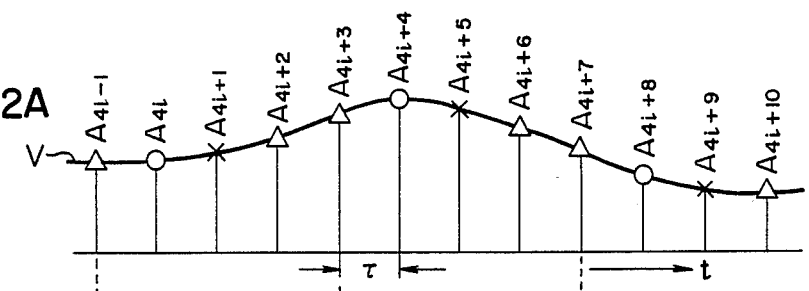
FIGS. 2A and 2B show a waveform and timing for explaining operation of the coding device indicated in FIG. 1.
Figure 3:
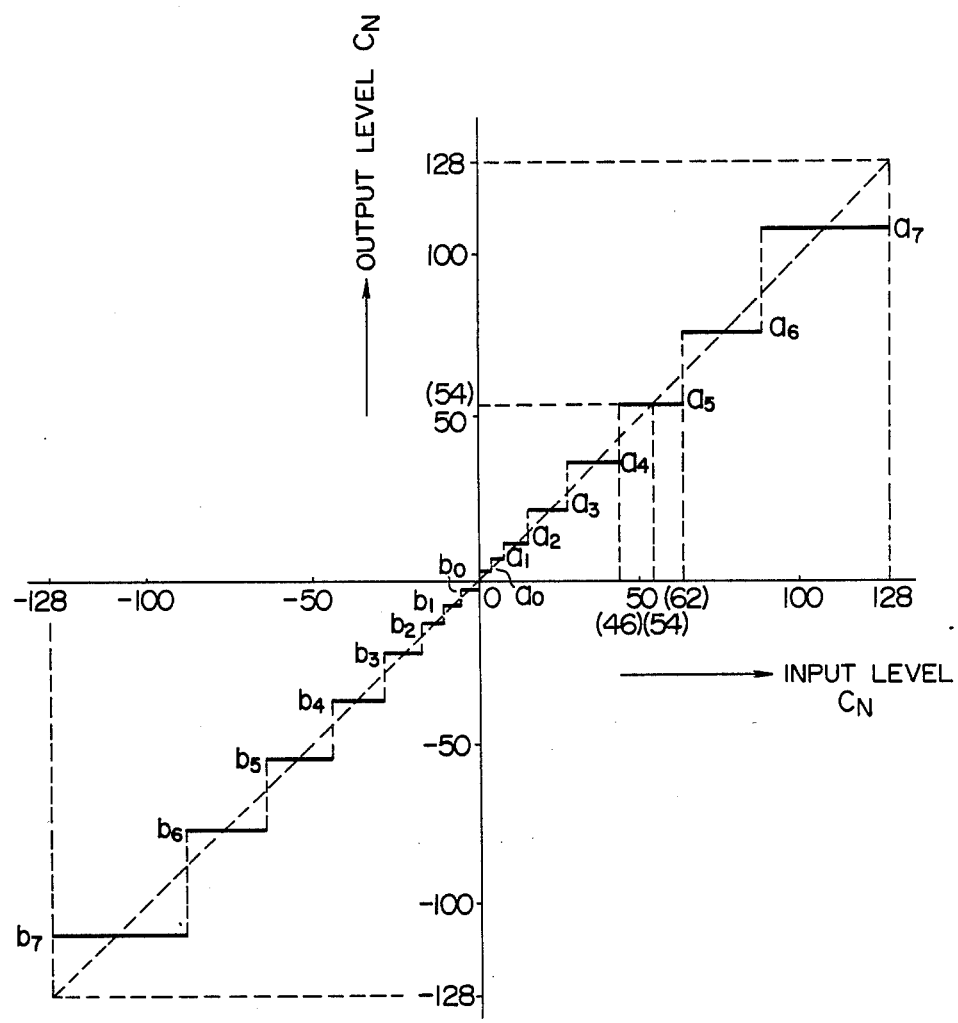
FIG. 3 shows coding and decoding characteristics.
Figure 4:
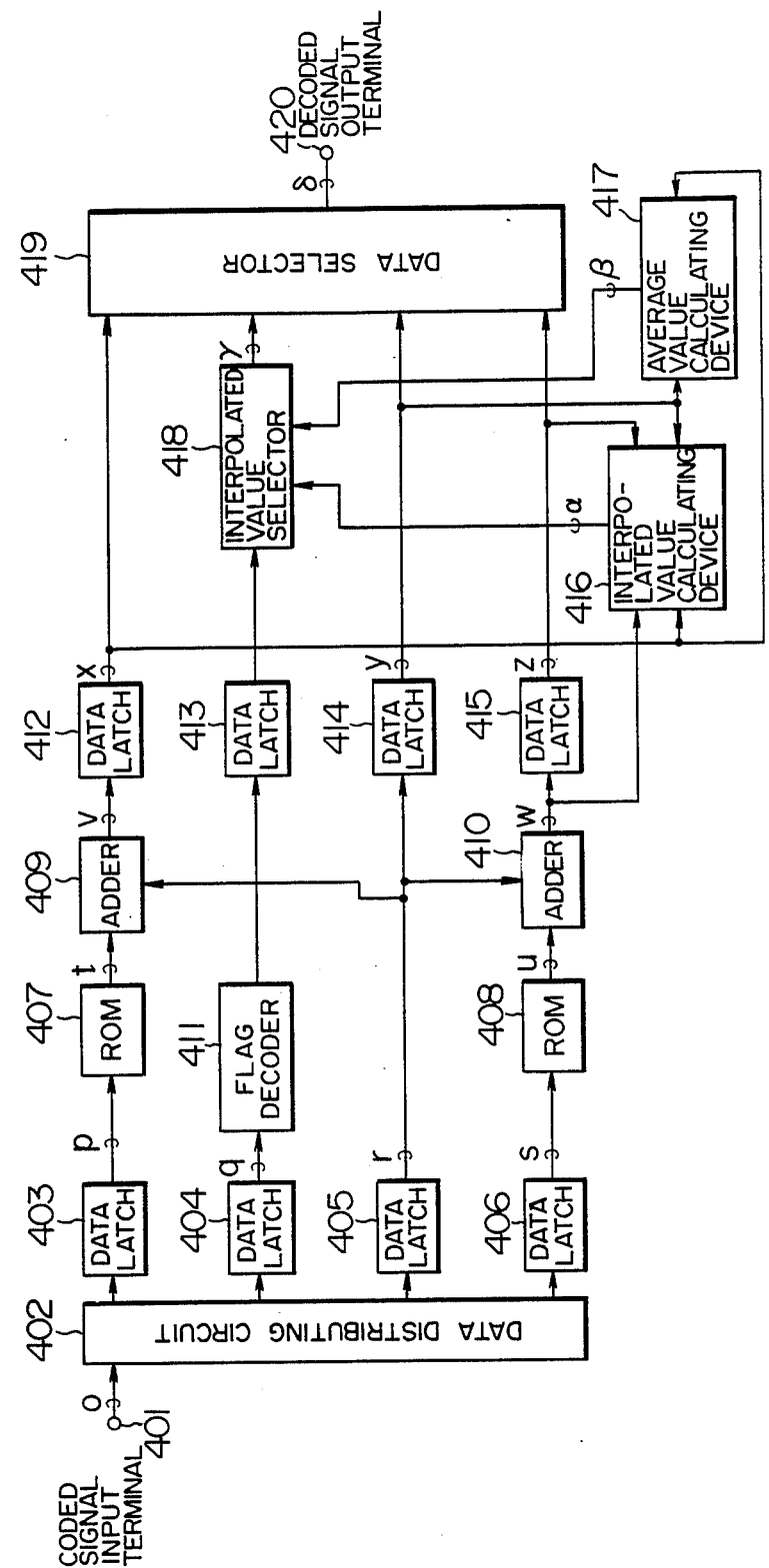
FIG. 4 is a block diagram illustrating a decoding device for the signals coded by the coding device illustrated in FIG. 1.

Hereinbelow this invention will be explained in more detail, using preferred embodiments. FIG. 1 is a block diagram illustrating an embodiment of the coding device according to this invention; FIGS. 2A and 2B show a waveform and the timing, respectively, for explaining the work thereof; FIG. 3 shows an example of coding characteristics thereof; FIG. 4 is a block diagram illustrating an embodiment of the decoding device for the signals coded according to this invention; and FIG. 5 is a timing chart for explaining the work thereof.

In FIG. 1 reference numeral 101 is an input terminal through which digital image signals, which are successively sampled and are to be coded, are inputted; 102 to 105 are delay circuits, each of which has a delay time equal to the sampling period $\tau$; 106 to 110 are data latches; 111 and 112 are subtracters; 113 and 114 are ROMs effecting the compression and coding; 115 is an average value calculating circuit; 116 is an interpolated value calculating device; 117 is a flag generating circuit for generating the flag indicating the optimum interpolation method; 118 is a data selector; 119 is a control circuit for controlling the data selector; and 120 is a coded signal output terminal.

A digital signal $A_i$ (i is an integer) of n bits, obtained by successively quantizing the image signal V indicated in FIG. 2A, with a period $\tau$ is inputted through the input terminal 101. The number of quantization bits n is a value which is so great that errors produced by quantization using it are negligibly small, and in this embodiment, where image signals are dealt with, it is decided that e.g. n=7.

This invention is characterized in that the coding processing is effected for every group of N sampled data (N being an integer greater than 2). FIGS. 1, 2A and 2B show an embodiment in which N=4. In this embodiment, among four sampled data represented by $(A_{4i-1}, A_{4i}, A_{4i+1}, A_{4i+2})$, as indicated in FIG. 2A, the sampled data $A_{4i}$ indicated by a mark o, are selected as the reference sampled data and are coded with n bits.

Hereinbelow, these reference sampled data are represented by the same symbol $A_{4i}$. In addition, the sampled data $A_{4i+1}$, indicated by a mark x, are not coded and therefore are not transmitted. This sampled data, which are not coded are obtained at the decoding by an interpolating calculation using other sampled data. For the other two sampled data $A_{4i-1}$ and $4_{4i+2}$, indicated by marks Δ, the difference between a predicted value obtained from the reference sample data $A_{4i}$ and each of the sampled data is compressed and coded. In this embodiment the reference sample data $A_{4i}$ and the difference therefrom are obtained by using the following equations:

$$B_{4i-1} = A_{4i-1} - A_{4i} \atop B_{4i+2} = A_{4i+2} - A_{4i}] \quad (1)$$

These two differences are coded with a number of bits m ($<n$). In this embodiment these two differential data $B_{4i-1}$ and $B_{4i+2}$ are coded to compressed differential data $C_{4i-1}$ and $C_{4i+2}$ of m=4. Further, in this embodiment, in order to reduce interpolation errors for the sample data $A_{4i+1}$ stated above, which are not coded, a flag $F_{4i+1}$ indicating the optimum interpolation method is transmitted. In this example two kinds of interpolation methods are used, and the number of bits of $F_{4i+1}$ is 1. In this way 16 bits (7+4×2+1) are used for N=4 sampled data, and therefore the average number of bits per pixel is 16/4=4. Consequently the number of bits is reduced to 4/7 with respect to that required by the method by which every pixel is coded with 7 bits.

The decrease of the number of bits based on the principle stated above is effected as follows. A digital image signal a (a in FIG. 2B) of n bits inputted through the input terminal 101 in FIG. 1 is inputted to the delay circuits 102 to 105 one after another and at the same time is inputted to the data latches 106 to 110 together with outputs of the delay circuits 102 to 105. The data are taken out from the data latches 106 to 110 with an interval which is four times as long as the sampling period $\tau$, and the data latch outputs b to f are indicated by b to f in FIG. 2B, respectively. Among them the reference sampled data ($A_{4i}$) are taken out from the data latch 109, and the output thereof e (e is FIG. 2B) is inputted to the data selector 118 and the two subtracters 111 an 112. The next but one sampled data ($H_{4i+2}$) to the reference sampled data ($A_{4i}$) is taken out from the data latch 107, and the output thereof c (c in FIG. 2B is inputted in the subtracter 111. The subtracter 111 forms the difference between the outputs c and e and a differential output g (g in FIG. 2B) of n+1 bits is obtained. The sampled data ($A_{4i}-1$) preceding the reference sample data ($A_{4i}$) are taken out from the data latch 110, and the output thereof f (f in FIG. 2B) is inputted to the subtracter 112. The subtracter 112 forms the difference between the outputs f and e, and a differential output h (h in FIG. 2B) of n+1 bits is obtained. The outputs g and h of these subtracters 111 and 112 are inputted in ROM 113 and ROM 114, respectively, and transformed into compressed differential data i and j (i and j in FIG. 2B) of m (=4) bits. FIG. 3 shows an example of the transformation characteristics of ROM 113 and ROM 114 for n=7 and m=4.

Sixteen (i.e. equivalent to 4 bits) data, in the whole corresponding to $a_0, a_1 \ldots a_7$ and $b_0, b_1, \ldots b_7$ indicated in FIG. 3, are written in ROM 113 and ROM 114. Among these data those whose address is specified, corresponding to the outputs g and h of n+1 (=8) bits from the subtracters 111 and 112, are read out. As an example, as indicated in FIG. 3, when the value of g or h (i.e., the value of the differential data $B_j$) is comprised between 46 and 62, data $C_i$ corresponding to $a_5$ is outputted from the ROM.

On the other hand the output c of the latch 107 and the output e of the latch 109 are inputted to the average value in FIG. 2B). The output thereof $D_{4i+1}$ is represented by:

$$D_{4i+1} = \frac{A_{4i} + A_{4i+2}}{2} \quad (2)$$

Further the output b (b in FIG. 2B) of the latch 106, the output c of the latch 107, the output e of the latch 109, and the output f of the latch 110 are inputted to interpolated value calculating circuit 116, which calculates an interpolated value, which is data corresponding to the output d (d in FIG. 2B) of the latch 108, on the basis of these values. In this embodiment an average value l (l in FIG. 2B) of an exterpolated value based on the outputs b and c and an exterpolated value based on the outputs e and f is outputted. That is, the output thereof $E_{4i+1}$ is represented by:

$$E_{4i+1} = \frac{\{A_{4i} + (A_{4i} - A_{4i-1})\} + \{A_{4i+2} + (A_{4i+2} - A_{4i+3})\}}{2} \quad (3)$$
$$= A_{4i} + A_{4i+2} - \frac{A_{4i-1} + A_{4i+3}}{2}$$

The output k of the average value calculating device 115, the output l of the interpolated value calculating device and the output d of the latch 108 are inputted to the flag generating circuit 117. The flag generating circuit 117 calculates an error included in the interpolated value $D_{4i+1}$ of $A_{4i+1}$ obtained by the average value calculating device 115 and an error included in the interpolated value $E_{4i+1}$ of $A_{4i+1}$ obtained by the interpolated value calculating device 116 and outputs the result obtained by comparing these quantities as the flag output m (m in FIG. 2B). That is, in this embodiment the flag output $F_{4i+1}$ is flag data of 1 bit, which is 0 when the error of $D_{4i+1}$ is smaller and 1 when the error of $E_{4i+1}$ is smaller.

The output e of the data latch 109, the output i of ROM 113, the output j of ROM 114 and the output m of the flag generating circuit 117 are inputted to the data selector 118. The data selector 118 selects them one after another, depending on the number of bits of each of the signal outputs, responding to instructions from the control circuit 119, and the output thereof n (n in FIG. 2B) is outputted through the coded signal output terminal 120. The output signal n consists of e.g. $C_{4i-1}$ of 4 bits $A_{4i}$ of 7 bits, $F_{4i+1}$ of 1 bit and $C_{4i+2}$ of 4 bits in the order indicated by n in FIG. 2B. Other pixels are dealt with in the same way and signals therefor are outputted. Further, depending on the structure of the system, it may be possible to modify the control signal from the control circuit 119 and to change the order of the output signal n of the data selector so that the signals are dealt with in units of 8 bits, e.g. 8 bits for $C_{4i-1}$ and $C_{4i+2}$ and 8 bits for $A_{4i}$ and $F_{4i+1}$. As explained above, by means of this coder it is possible to reduce the number of bits from 7 bits for each of 4 pixels, i.e. 28 bits in total, to 16 bits, i.e. by a factor of 4/7. Here, in the output of the data selector 118 indicated by n in FIG. 2B the position and the length of e.g. $C_{4i-1}$, $A_{4i}$, $F_{4i+2}$ and $C_{4i+2}$ indicated in the figure don't represent correctly the relation between different signals in the output timing, the number of bits, etc.

Now the work of the decoding device according to this invention will be explained, referring to FIGS. 4 and 5. In the embodiment indicated in FIG. 4, the signal coded by the coder in the embodiment explained above and indicated in FIG. 1, whose number of bits is reduced by a factor of 4/7 in unit of 4 pixels of 7 bits, is decoded.

In FIG. 4, reference numeral 401 is a signal input terminal, through which the coded signal, whose number of bits per pixel is reduced, is inputted; 402 is a data distributing circuit, which distributes signal data corresponding to each of the pixels; 403 to 406 and 412 to 415 are data latches; 407 and 408 ar ROMs extending compressed and coded data; 409 and 410 are adders for decoding differential data; 411 is a flag decoder which decodes the flag indicating the optimum interpolation method and outputs a data select signal; 416 is an interpolated value calculating device; 417 is an average value calculating device; 418 is a interpolate value selector which selects and outputs the optimum interpolated value; 419 is a data selector for changing over data of the pixels and outputting them one after another; and 420 is a decoded signal output terminal.

A signal indicated by o in FIG. 5, whose number of bits is reduced by the coder, an example of which is indicated in FIG. 1, is inputted through the signal input terminal 401. This input signal o is divided into a plurality of data groups corresponding to the pixels by the data distributing circuit 402, which are sent to the data latches 403 to 406, respectively. In this embodiment, since the number of sampled data of one group dealt with to be coded N=4, the data divided into 4 groups are inputted to the data latches 403 to 406, respectively. The data latches 403 to 406 take out data with a period which is 4 times as long as the sampling period $\tau$, the outputs thereof p to s being indicated by p to s in FIG. 5. Among them the data latch 405 takes out the reference sample data ($A_{4i}$) quantized with n (=7) bits by the coder and the output thereof r (r in FIG. 5) is inputted in the data latch 414 as well as the two adders 409 and 410. The data latch 403 takes out the compressed differential data ($C_{4i+2}$) corresponding to the sample data, which are next but one to the reference sample data ($A_{4i}$), and the output thereof p (p in FIG. 5) is inputted in ROM 407. The data latch 406 takes out the compressed differential data ($C_{4i-1}$) corresponding to the sample data preceding the reference sample data ($A_{4i}$) and the output thereof s (s in FIG. 5) is inputted in ROM 408. Further the data latch 404 takes out the flag data ($F_{4i+1}$) indicating the optimum interpolation method for the sample data ($A_{4i+1}$), which has not been coded and therefore has not been transmitted, and the output thereof g (g in FIG. 5) is inputted in the flag decoder 411.

ROMs 407 and 408 extend compressed data of m (=4) bits to data of n+1 (=8) bits according to the characteristics indicated in FIG. 3 explained above. When the outputs p and s of the data latches 403 and 406, which are compressed differential signals, are given thereto as addresses, differential data ($B_{4i+2}$, $B_{4i-1}$) extended to 8 bits are outputted therefrom, respectively. As an example, in the case where the output data ($C_i$) of the data latch 403 or 406 are a value corresponding to as data ($B_i$) having a value of 54 are outputted as an output t or u (t or u in FIG. 5) of ROM 407 or 408. The outputs t and u of ROMs 407 and 408 are inputted to the adder 409 and the adder 410, respectively, where the reference sampled data ($A_{4i}$), which are the output r of the data latch 405, is added thereto. The adder 409 and the adder 410 effect operations represented by the following equations:

$$A_{4i+2} = B_{4i+2} + A_{4i} \\ A_{4i-1} = B_{4i-1} + A_{4i}$$ (4)

respectively, and in this way the sample data which have been differential-coded by the coder, are decoded. The outputs v and w (v and w in FIG. 5) of the adders 409 and 410 are inputted to the data latches 412 and 415, respectively. Further the output w of the adder 410 is inputted also to the interpolated value calculating device 416. The flag decoder 411 decodes the flag data ($F_{4i+1}$) taken out from the data latch 404 and outputs an interpolated value selecting signal to the data latch 413.

The data latches 412 to 415 latch the input data with a period of $4\tau$ ($\tau$ being the sampling period). The output thereof is delayed by $4\tau$ with respect to the respective input data. Therefore the outputs x, y and z of the data latches 412, 414 and 415 are indicated by x, Y and z in FIG. 5, respectively. These outputs of the data latches 412, 414 and 415 are inputted to the data selector 419. At the same time the outputs x and y of the data latches 412 and 414 are inputted to the interpolated value calculating device 416 and the average value calculating device 417, and the output z of the data latch 415 is inputted to the interpolated value calculating device 416.

The interpolated value calculating device 416 is the same as the interpolated value calculating device 116 in the coder, which has been already explained, referring to FIG. 1, and the output thereof $\alpha$ has a value ($E_{4i+1}$) based on Eq. (3) stated above, as indicated by $\alpha$ in FIG. 5. Further, the average value calculating device 417 is the same as the average value calculating device 115 in the coder and the output thereof $\beta$ has a value ($D_{4i+1}$) based on Eq. (2) stated above, as indicated by $\beta$ in FIG. 5. The output $\alpha$ of the interpolated value calculating device 416 and the output $\beta$ of the average value calculating device 417 are inputted to the interpolated value selector 418. To the interpolated value selector 418 is inputted a signal delayed by $4\tau$ by the data latch 413 for selecting and outputting one of the interpolated value selecting signals, i.e. the output $\alpha$ of the interpolated value calculating device 416, which is inputted to the interpolated value selector 418 at that time, or the output $\beta$ of the average value calculating device, whichever one is judged to have smaller interpolation error at the coding. Consequently the output $\tau$ ($\tau$ in FIG. 5) of the interpolated value selector 418 represents the optimum interpolated data having small errors as the interpolated value ($A_{4i+1}$), which is inputted to the data selector 419. Then the data selector 419 outputs the outputs x, y, z and $\tau$ of the data latches 412, 414, 415 and the interpolated value selector 418, respectively, one after another in the original order with the original interval through the decoded signal output terminal 420. This output $\delta$ is a signal having the order before the coding and the sampling period $\tau$, and the number of bits is also restored to n (=7), as indicated by $\delta$ in FIG. 5.

As explained above, according to this invention, although a part of the sample data ar not transmitted in order to reduce the number of bits per pixel, deterioration in the image quality is relatively small with respect to the reduction rate of the number of bits, because interpolation is effected with a high precision.

Next an embodiment, in the case where this invention is applied to a magnetic recording/reproducing device such as a VTR, will be explained below, referring to FIG. 6. In FIG. 6 reference numeral 601 is a video signal input terminal; 602 is an A/D converter; 603 is a coder, an example of which has been described, referring to FIG. 1; 604 is a PCM processor; 605 is a memory; 606 is a recording modulator; 607 is a recording amplifier; 608 is a magnetic head; 609 is a magnetic tape; 610 is a reproducing amplifier; 611 is a demodulator; 612 is a device for data interpolation between lines; 613 is a decoder, an example of which has been described, referring to FIG. 4; 614 is a D/A converter; and 615 is a video signal output terminal. In this embodiment, a case will be described, in which in addition to the coding described above, a method is used by which M lines having great image correlation are brought together in a set, and sample data are thinned out so that transmitted sampled data are not overlapped over different lines. Further, in this embodiment, a case where M=2 is explained. The number of quantization bits n, the number of compressing and coding bits m, and the number N of sample data of one set are identical to those used in the embodiment indicated in FIGS. 1 and 4, i.e. it is assumed that n=7, m=4 and N=4. In addition the explanation will be made assuming that the image signal dealt with is an NTSC composite color video signal.

An image signal V inputted through the video signal input terminal 601 is transformed into a digital signal a of a number of quantization bits n by the A/D converter 602. Thus, digital signal a of n bits is suitably coded by the coder 603 according to this invention, an example of which is indicated in FIG. 1, as described previously. However, in this embodiment indicated in FIG. 6 the number of transmitted bits per pixel is further reduced than that used in the embodiment indicated in FIGS. 1 and 4 by thinning out signals in one set of M (=2) lines. Consequently the control circuit (119 in FIG. 1) of the coder 603 effects the switching control so that the output of the data selector (118 in FIG. 1) is n' or n" in predetermined unit of two lines. In this way, through the output n of the coder 603, for one line in a predetermined set of two lines $A_{4i}$ and $F_{4i+1}$ are outputted among data, e.g. $C_{4i-1}$, $A_{4i}$, $F_{4i+1}$, $C_{4i+2}$ and for the other line $C'_{4i-1}$ and $C'_{4i+2}$ are outputted among data, which are similarly $C'_{4i-1}$, $A'_{4i+1}$, $C'_{4i+2}$. Here, in this embodiment, since the NTSC composite video signal is dealt with, the predetermined set of two lines is composed of signals, e.g. in two lines having the same line number, which are distant from each other by two frames, for which the correlation of the image signal is great and the phase of the color subcarrier is identical. The control signal therefor can be formed by including a frame counter and a line counter in the control circuit (119 in FIG. 1).

The output n (hereinbelow called simply data n) coded as described above of the code 603 is written successively in the memory 605 through the PCM processor 604. When the data are written in the memory 605, an address signal indicating the address and a so-called parity signal for error detection and correction, etc. are added thereto by the PCM processor 604, as needed, for every block consisting of a predetermined number of bits of the data n. The data f written in the memory 605 and the added signals need are read out again by the PCM processor 604 and subjected to shuffling and interleaving according to circumstances. A synchronization signal for cuing the data block, an error detection and correction signal as needed, start-stop signal suitably disposed before and after each data series, etc. are added to the signal read out in this way from the memory 605, and they are outputted from the PCM processor.

This output data series from the PCM processor 604 is modulated to coded signals suitable for magnetic recording by the modulator 606, and thereafter the output thereof is recorded successively on the magnetic tape 609 by the magnetic head 608 through the recording amplifier 607.

Now, in the reproducing system, a signal reproduced by the magnetic head from the magnetic tape 609 is inputted in the demodulator 611 through the reproducing amplifier 610. The demodulator 611 outputs a signal equivalent to the data series inputted in the modulator 606 stated above after having equalized suitably the reproduced signal. This output data series from the demodulator 611 is inputted in the PCM processor 604 and written in the memory 605 after having carried out cuing of the data by means of the synchronization signal added to the data series, decoding of the error detection and correction signal, etc. The data written in the memory are read out by the PCM processor after having removed the shuffling and interleaving performed at recording. Then, error correction is effected by using the parity signal, thereafter redundant signals are removed, and finally they are inputted in the data interpolating device 612.

Figure 7:
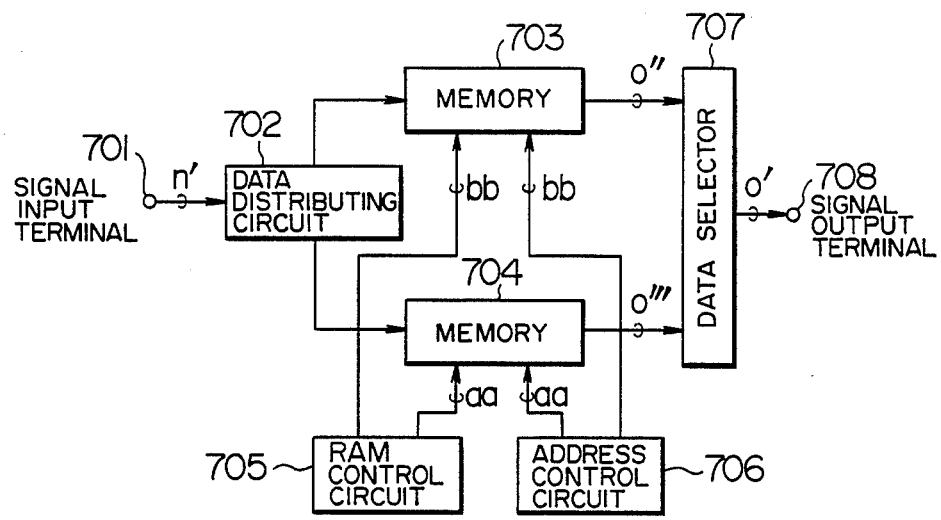
FIG. 7 is a block diagram illustrating an embodiment of the data interpolating device according to this invention.

The data interpolating device 612 is constructed e.g as indicated in FIG. 7. In FIG. 7 reference numeral 701 is a signal input terminal; 702 is a data distributing circuit; 703 and 704 are memories; 705 is an RAM control circuit controlling write-in and read-out of the memories; 706 is an address control circuit controlling writing and reading addresses for the memories; 707 is a data selector; and 708 is a signal output terminal. FIGS. 8A and 8B are timing charts for explaining signals in various parts of the data interpolating device indicated in FIG. 7 as an example.

A signal n' (n' in FIG. 8A), which is equivalent to the signal n' (n' in FIG. 2B) outputted by the coder 603 at the recording is inputted through the signal input terminal of the data interpolating device 612. The inputted signal n' is distributed and inputted to the memories 703 and 704 by the data distributing circuit 702. The memories 704 and 703 are controlled by the RAM control circuit 705 and the address control circuit 706 as indicated at aa and bb in FIG. 8A. That is, the data in the signal n' are alternately written in the memories pair by pair at a corresponding address so that $C_{4i-1}$, $C_{4i-2}$ are written at an address X−1 in the memory 704; $A_{4i}$, $F_{4i+1}$ at an address X in the memory 703; $C_{4i+3}$, $C_{4i+6}$ at an address X in the memory 704, . . . . In this embodiment the compressed differential data such as $C_{4i-5}$, $C_{4i-2}$, $C_{4i+3}$, $C_{4i+6}$, etc. are composed of 4 bits; the reference sample data such as $A_{4i}$, etc. are composed of 7 bits; and the optimum interpolation flag such as $F_{4i+1}$, etc. are composed of 1 bit. Thus each pair of the data is composed of 8 bits. Consequently, the memories 703 and 704 in the data interpolating device indicated in FIG. 7 are composed of e.g. 8 bits per word.

On the other hand, a signal as indicated by n" in FIG. 2B is inputted for the other signal line paired with the image signal line, and its data are written in the memories 703 and 704, as described above, i.e. the same line after two frames in this embodiment. Under the identical control, data are written in the memories 703 and 704 so that $A'_{4i-4}$ and $F'_{4i-3}$ are written at an address $X-1+2$ frames in the memory 703; $C'_{4i-1}$ and $C'_{4i+2}$ are written at an address $X+2$ frames in the memory 704; $A'_{4i-4}$ and $F'_{4i-3}$ are written at an address $X+2$ frames in the memory 703; . . . .

The reading out of the data from the memories 703 and 704 is effected in parallel to the writing of the data described above. However, the address for the reading is so controlled that it is at least before the address for the writing of the data. That is, when the address for the written data is X, the address for the reading are values which are not greater than $X-1$ and $X-1-2$ frames, respectively. Therefore, in order to facilitate the understanding of the correspondence of the read-out data to those written-in, as explained above, in the following explanation address greater than $X+2$ frames at the moment thereof.

The reading-out of the data from the memories 703 and 704 is effected under the control of the RAM control circuit 705 and the address control circuit 706 in the same way as at the writing. As indicated by aa and bb in FIG. 8B, the reading-out of the data is effected simultaneously from the memories 703 and 704. That is, at the same time as the reading-out of the data at the address $X-1$ from the memory 704, the data at the address $X-1+2$ frames, which is two frames after the former, are read-out from the memory 703. Then the data at the address X in the memory 703 and those at the address $X+2$ frames in the memory 704, subsequently those at the address X in the memory 704 and those at the address $X+2$ frames in the memory 703, . . . are readout. In this way the memories are so controlled that the data at a pair of addresses, which are apart by two frames from each other are read-out alternately one after another. Under such control the output o" is $C_{4i-5}$, $C_{4i-2}$, $C'_{4i-1}$, $C'_{4i+2}$, $C_{4i+3}$, $C_{4i+5}$, . . . as indicated by o" in FIG. 8B, while the output o''' is $A'_{4i+4}$, $F_{4i-3}$, $A_{4i}$, $F_{4i+1}$, $A'_{4i+4}$, $F'_{4i+5}$, . . . as indicated by o''' in FIG. 8B, both of which are inputted to the data selector 707. The data selector 707 selects and outputs the output o" of the memory 703 and the output o''' of the memory 704 in a predetermined order. The output thereof o' is a data series interpolated between two lines, as indicated by o' in FIG. 8B, which are sent again to the PCM processor 604 through the signal output terminal 708.

In this embodiment, since the transmitted data are arranged alternately so that $C'_{4i-1}$ and $C'_{4i+2}$ are transmitted by the line two frames after the line transmitting $A_{4i}$ and $F_{4i+1}$, and $A''_{4i}$ and $F''_{4i+1}$ are transmitted by the line a further two frames thereafter, it is possible to interpolate data both always with data after two frames and always with data before two frames. Further the interpolation may be effected by suitably switching over the data after two frames and the data before two frames. For example it is possible also to switch over the data so as to obtain the data having a greater correction, depending on the amount of movement in the image. All of these are made possible by varying the structure of the RAM control circuit 705 and the address control circuit 706. Still further it is possible to fix a pair of two lines, which are separated by two frames from each other, and to effect the interpolation between them. In this case, as stated above, it is not necessary that the transmitted data after two frames be $A''_{4i}$ and $F''_{4i+1}$.

Although there are two memories shown in the embodiment indicated in FIG. 7, this invention can be implemented by using one memory in which the address is suitably modified. Further, although this embodiment is so constructed that the reference sample data and the flag are always stored in the memory 703 and the compressed and coded differential values are always stored in the memory 704, these can exist mixed in the memories. For example, they may be so constructed that all the data in a certain line are written in the memory 703 and all the data in a line, which is distant by two frames therefrom, are written in the memory 704. These can be done without any deviation from the essential spirit of this invention.

The data interpolation is effected between different lines as described above, and the data inputted to the PCM processor 604 are inputted to the decoder 613 in the form of data o, which are identical to the data n outputted by the coder 603. The decoder 613 decodes the inputted data, as explained in the embodiment, referring to FIG. 4, and outputs a digital signal $\gamma$ of n (=7) bits to the D/A converter 614. The D/A converter 614 restores this digital signal $\gamma$ to an analogue video signal V', which is outputted through the video signal output terminal 615.

As explained above, by using a coder, a decoder and an interpolating device according to this invention, it is possible to reduce the number of bits of recorded signals with a high efficiency in a digital VTR, etc. and to decode the coded data precisely.

In the embodiment of this invention explained referring to FIGS. 1 to 8, for the sample data, which have not been coded by the coder, a flag of one bit, indicating which among two kinds of interpolation methods gives rise to smaller interpolation errors, has been transmitted, and the decoder has selected one of the interpolation methods on the basis of this flag. However, these interpolation methods are not restricted to two kinds, but it is also possible to increase the number of kinds by adding preceding value holding, interpolation by a second order curve, etc. to that described above. In this case it is necessary to increase the number of bits, depending on the kind of interpolation. To the contrary, when the interpolation is fixed to one kind, the transmission of this flag can be omitted, which has the effect that the number of transmitted bits is reduced. In any case, in order to effect the interpolation with high precision, it is efficient to arrange the sampled data, which are not coded but obtained by interpolation as explained in the embodiment described above, so that they are not successive. Further, in the case where the interpolation method is a method by which the interpolated value is represented by the average of extrapolated values based on adjacent sampled data and those, which are adjacent but one, on both the sides, i.e. by Eq. (3) described previously, precise interpolation is possible, whether the video signal is a composite signal or a component signal. However, in this case, it is necessary that the sampled data, which are adjacent and adjacent but one to those to be interpolated, are those to be coded and transmitted as indicated by the waveform in FIG. 2A.

Next, in the coder and the decoder according to this invention indicated in FIGS. 1 and 4 respectively, all the sampled data ($C_{4i-1}$, $C_{4i+2}$), for which differential values with respect to the reference sample data ($A_{4i}$) are compressed and coded, have been coded with the same number of bits m (=4). Further, the same compressing and extending characteristics have been used therefor. However, in the case where the distances from the reference sampled data are different such that one is adjacent and the other is adjacent but one thereto, as indicated in FIG. 2, it is efficient for reducing coding errors to increase the number of coding bits of the sampled data which are more distant, or to change the compressing and extending characteristics. In the case where the magnitude of the group of sampled data to be dealt with to be coded is four, as in the embodiment indicated in FIGS. 1 and 4, it is also possible to locate the sampled data whose differential value is compressed and coded so as to be adjacent to the reference sampled data on both the sides and the sampled data which are neither coded nor transmitted so as to be adjacent but one to the reference sampled data. In this case, since the distances between the two sampled data to be compressed and coded and the reference sampled data are equal, it is not necessary to use specifically different numbers of coding bits or different compressing and extending characteristics for two sampled data to be compressed and coded. However, taking into account the increase in the interpolation precision of the sampled data, which are neither coded nor transmitted and which are interpolated on the basis of coded sampled data in the neighborhood, it is efficient to locate the reference sampled data so as to be adjacent to the sampled data which are neither coded nor transmitted or to increase the number of coding bits of the compressed and coded sampled data which are adjacent to the sampled data which are neither coded nor transmitted.

Next, as another embodiment of the coder and the decoder according to this invention, an example, in which attention is paid to the reduction of coding errors and the increase in the interpolation precision, as stated above, will be explained, referring to FIGS. 9, 10A, 10B, 11 and 12. Here, as an interpolation method, only an average value of extrapolated values from both the sides, using the sampled data, which are adjacent and adjacent but one thereto, on both the sides is used (refer to Eq. (3) stated previously) and no flag indicating the optimum interpolation method is transmitted.

Figure 9:
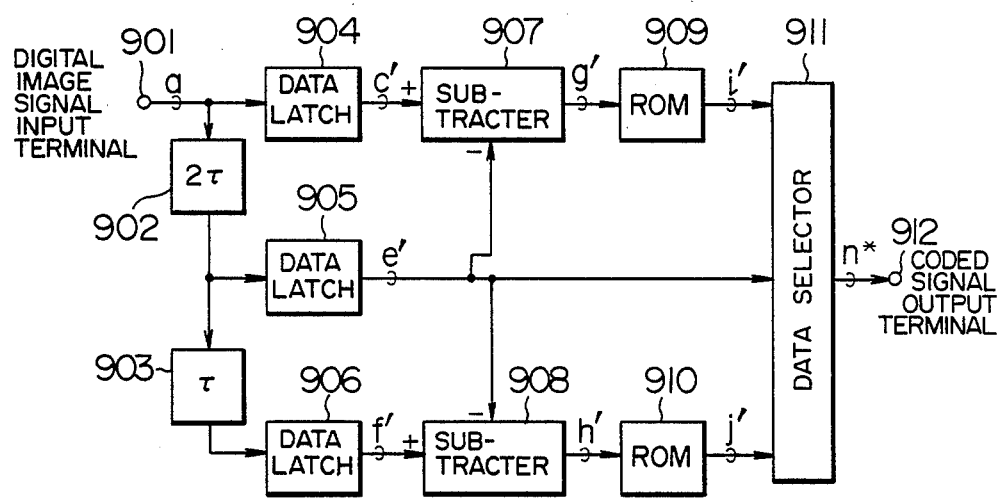
FIG. 9 is a block diagram illustrating another embodiment of the coding device according to this invention.
Figure 11:
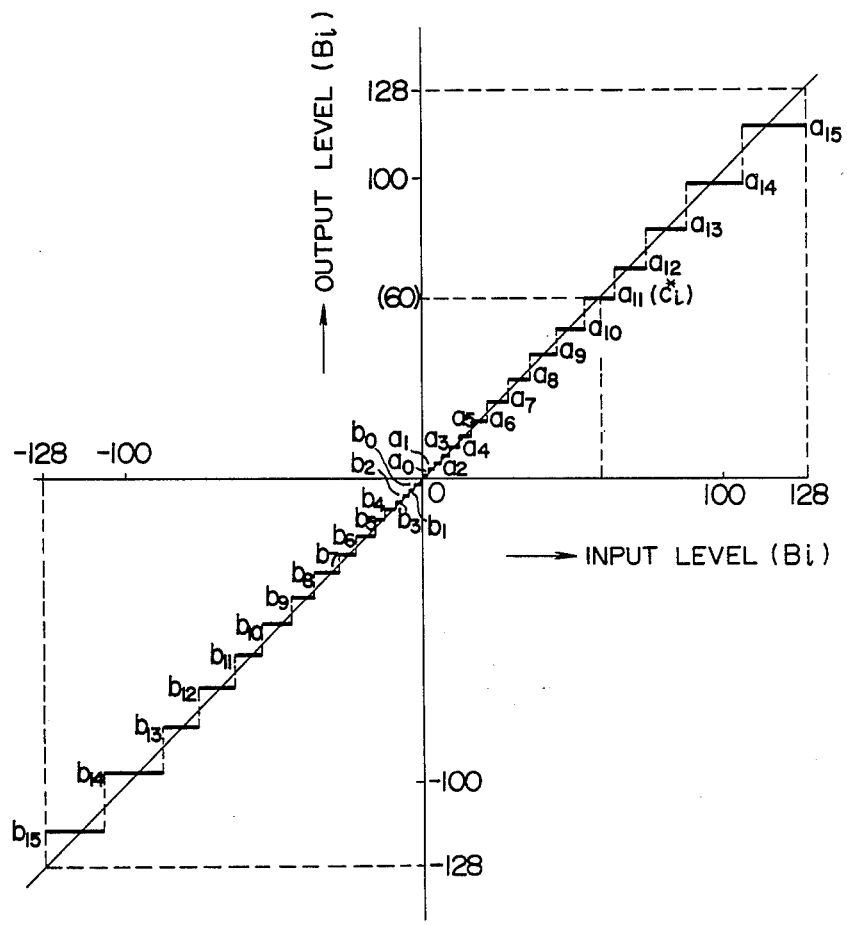
FIG. 11 shows another example of coding and decoding characteristics.
Figure 12:
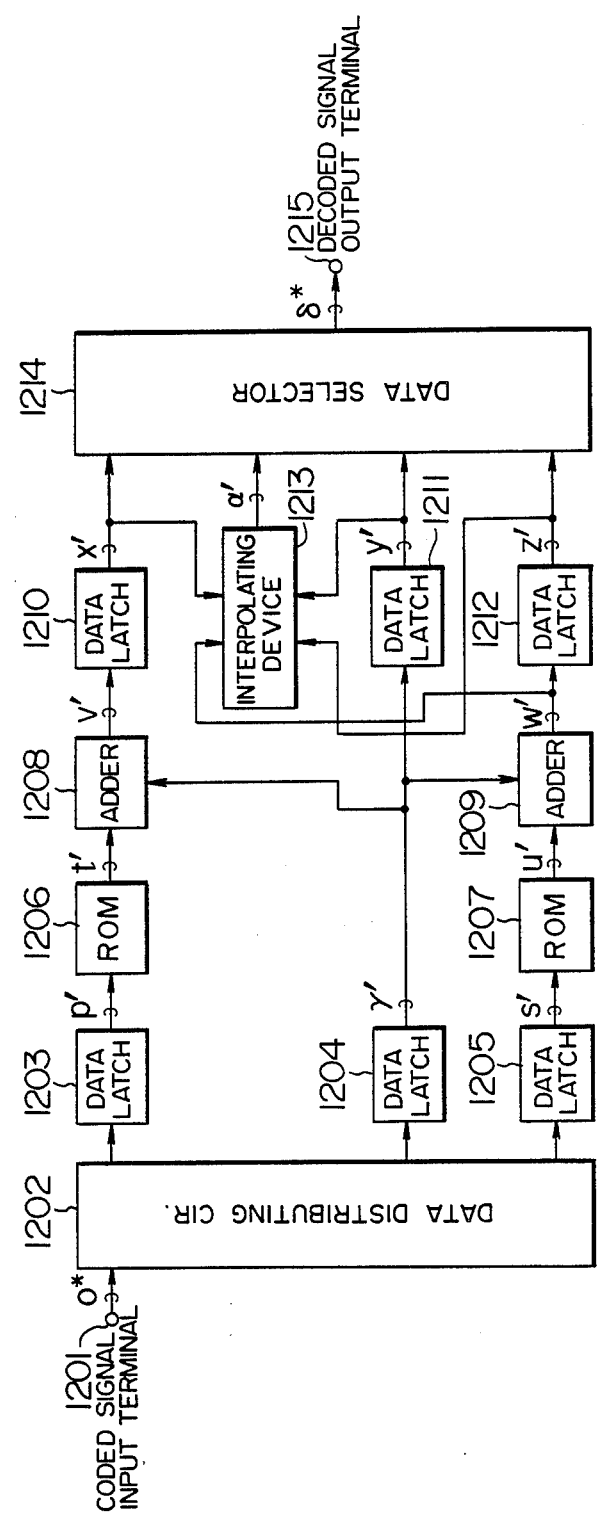
FIG. 12 is a block diagram illustrating an example of the decoding device for the signals coded by the device indicated in FIG. 9.

FIG. 9 is a block diagram illustrating another embodiment of the coding device according to this invention; FIG. 10A shows a waveform and FIG. 10B is a timing chart for explaining the work of the device indicated in FIG. 9; FIG. 11 shows another example of coding and decoding characteristics; FIG. 12 is a block diagram illustrating an example of the decoding device according to this invention; and FIG. 13 is a timing chart for explaining the work of the device indicated in FIG. 12.

In FIG. 9 reference numeral 901 is an input terminal for digital image signals to be coded, which are successively sampled; 902 is a delay circuit having a delay time which is two times as long as the sampling period $\tau$; 903 is a delay circuit having a delay time which is as long as the sampling period $\tau$; 904 to 906 are data latches; 907 and 908 are subtractors; 909 and 910 are compressing and coding ROMs; 911 is a data selector; and 912 is a coded signal output terminal. Further, although a control circuit controlling the data selector indicated in the embodiment in FIG. 1 is used here, description thereof is omitted in this embodiment indicated in FIG. 9.

A digital signal $A_i$ (i being an integer) of n bits obtained by successively quantizing image signal V indicated in FIG. 10A with a period $\tau$ is inputted through the input terminal 901. Here it is decided that e.g. n=1, just as in the embodiment indicated in FIG. 1. Further, this embodiment is an example in which the magnitude N of the group of sampled data, which are to be coded is similarly four. In this embodiment among four sampled data represented by $A_{4i-1}$, $A_{4i}$, $A_{4i+1}$, $A_{4i+2}$ as indicated in FIG. 10A, the sample data $A_{4i}$ indicated by a mark o are selected as the reference sample data and coded with n bits. Hereinbelow these reference sample data are represented by the same symbol $A_{4i}$ just as in the embodiment indicated in FIG. 1. In addition, the sample data $A_{4i+1}$ indicated by a mark x are not coded, but obtained at the decoding by an interpolation calculation, using the reference sample data, which are adjacent thereto, etc. For the other two sampled data $A_{4i-1}$ and $A_{4i+2}$, and indicated by marks $\Delta$, the difference between a predicted value obtained from the reference sampled data $A_{4i}$ and each of the sampled data is compressed and coded. In this embodiment also, just as in the embodiment indicated in FIG. 1, assuming that the predicted value is the reference sampled data $A_{4i}$ stated above, the differences therefrom are obtained by using Eq. (1) described above, and these two differential data $B_{4i-1}$ and $B_{4i+2}$ are compressed and coded. Here the differential data $B_{4i-1}$ are sampled data, which are adjacent to the reference sampled data $A_{4i}$ and which are compressed to m ($<$n) bits. On the other hand, since the differential data $B_{4i+2}$ are adjacent but one to the reference sampled data $A_{4i}$, the distance thereof from the reference sampled data $A_{4i}$ is greater than that of the differential data $B_{4i-1}$. Further, since it is adjacent to the sampled data, which are neither coded nor transmitted, but interpolated, in order to reduce coding errors and interpolation errors, it is compressed to a number of bits l, which is greater than m stated above. In this embodiment the differential data $B_{4i-1}$ are coded to compressed differential data $C_{4i-1}$ of m=4 bits and the differential data $B_{4i+2}$ are coded to compressed differential data $C_{4i+2}$ of l=5 bits. In this way the average number of bits per pixel is 16/4=4 and so is reduced by 4/7 with respect to that required by the method by which every pixel is coded with 7 bits.

A digital image signal a (a in FIG. 10B) of n bits inputted through the input terminal 901 in FIG. 9 is inputted to the delay circuits 902 and 903 one after another and at the same time inputted to the data latches 904 to 906. The data are taken out from the data latches 904 to 906 with an interval which is four times as long as the sampling period $\tau$, and the latch outputs c', e' and f' are indicated by c', e' and f' in FIG. 10B, respectively. Among them the reference sampled data ($A_{4i}$) are taken out from the data latch 905, and the output thereof e' (e' in FIG. 10B) is inputted to the data selector 911 and the two subtracters 907 and 908. The next but one sampled data ($A_{4i+2}$) to the reference sampled data is taken out from the data latch 904, and the output thereof c' (c' in FIG. 10B) is inputted to the subtracter 907. The sampled data ($A_{4i-1}$) preceding the reference sample data ($A_{4i}$) are taken out from the data latch 906, and the output thereof f' (f' in FIG. 10B) is inputted to the subtracter 908. The subtracter 907 effects a differential operation between the output c' of the data latch 904 and the output e' of the data latch 905, and a differential output g' (g' in FIG. 10B) of n+1 bits is obtained. Likewise the subtracter 908 effects a differential operation between the output f' of the data latch 906 and the output e' of the data latch 905, and a differential output h' (h' in FIG. 10B) of n+1 bits is obtained. These outputs g' and h' of the subtracters 907 and 908 are inputted to ROM 909 and ROM 910, respectively. ROM 909 is destined to compress and code the differential data ($B_{4i+2}$) of the sample data, which are distant from the reference sample data ($A_{4i}$) and adjacent to the sample data ($A_{4i+1}$), which are not coded, and the differential output g' of n+1 bits is transformed into compressed differential data i' (i' in FIG. 10B) of l=5 bits. FIG. 11 shows an example transformation characteristics of ROM 909 for n=7 and l=5.

Thirty-two (i.e. equivalent to 5 bits) data in the whole, corresponding to a $a_0$, $a_1$, ... $a_{15}$ and $b_0$, $b_1$, ... , $b_{15}$ indicated in FIG. 11, are written in ROM 909. The address of these data is specified, responding to the output g' of n+1 (=8) bits from the subtracter 907, and they are read out. As an example, as indicated in FIG. 11, when the value of g' (i.e. the value of the differential data $B_i$) is 60, data $C^*_i$ corresponding to all is outputted by the ROM.

Figure 10:
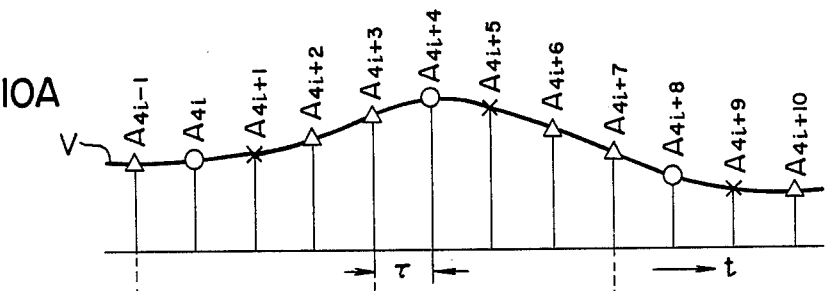
FIGS. 10A and 10B show a waveform and a timing chart, respectively, for explaining the operation of the device indicated in FIG. 9.

On the other hand, just as with ROMs 113 and 114 described in the embodiment indicated in FIG. 1, ROM 910 transforms the output h' of n+1 bits of the subtracter 908 into compressed differential data j' of m (=4) bits (j' in FIG. 10). An example of the transformation characteristics of ROM 910 has already been indicated in FIG. 3.

The output e' of the data latch 905, the output i' of ROM 909 and the output j' of ROM 910 are inputted to the data selector 911, which selects them one after another, depending on the number of bits of each of the signal outputs, and outputs them. As the result, the output n* of the data selector 911 consists of e.g. $C_{4i-1}$ of 4 bits, $A_{4i}$ of 7 bits and $C_{4i-2}$ of 5 bits, as indicated by n* in FIG. 10B. Other pixels are dealt with in the same way and signals are outputted through the coded signal output terminal 912.

Now the work of the decoding device according to this embodiment, corresponding to the coding device indicated in FIG. 9, will be explained, referring to FIGS. 12 and 13. In the decoding device of this embodiment the signal coded by the coder explained above and indicated in FIG. 9, whose number of bits is reduced by a factor of 4/7 in unit of 4 pixels of 7 bits, is decoded.

In FIG. 12 reference numeral 1201 is a signal input terminal, through which the coded signal, whose number of bits per pixel is reduced, is inputted; 1202 is a data distributing circuit, which distributes signal data corresponding to each of pixels; 1203 to 1205 and 1210 to 1212 are data latches; 1206 and 1207 are ROMs extending compressed and coded data; 1208 and 1209 are adders for decoding differential data; 1213 is an interpolated value calculating device; 1214 is a data selector changing over data of the pixels and outputting them one after another; and 1215 is a decoded signal output terminal.

A signal indicated by o* in FIG. 13, whose number of bits is reduced by the coder, an example of which is indicated in FIG. 9, is inputted through the signal input terminal 1201. This input signal o* is divided into a plurality of data groups, corresponding to the pixels, by the data distributing circuit 1202, and these data groups are sent to the data latches 1203 to 1205, respectively. In this embodiment, since the number of sampled data of one group to be coded N=4 and one of these sampled data is not coded, the data divided into three of the groups are inputted to the data latches 1203 to 1205. The data latches 1203 to 1205 take out data with a period, which is four times as long as the sampling period $\tau$, the outputs thereof p', r' and s' being indicated by p', r' and s' in FIG. 13. Among them the data latch 1204 takes out the reference sample data ($A_{4i}$) quantized with n (=7) bits by the coder, and the output thereof r' (r' in FIG. 13) is inputted to the data latch 1211 as well as to the two adders 1208 and 1209. The data latch 1203 takes out the compressed differential data ($C_{4i+2}$) of l (=5) bits corresponding to the sampled data which are next but one to the reference sampled data ($A_{4i}$), and the output thereof p' (p' in FIG. 13) is inputted to ROM 1206. Further, the data latch 1205 takes out the compressed differential data ($C_{4i-1}$) of m (=4) bits corresponding to the sampled data preceding the reference sampled data ($A_{4i}$), and the output thereof s' (s' in FIG. 13) is inputted to ROM 1207.

ROM 1206 extends compressed data of m (=4) bits to data of n+1 (=8) bits according to the characteristics indicated in FIG. 11 explained above. When the output p' of the data latch 1203, which are compressed differential signals, are given thereto as an address, differential data ($B_{4i+2}$) extended to 8 bits are outputted therefrom. As an example, in the case where the output data ($C^*_i$) of the data latch 1203 are a value corresponding to $a_{11}$, data ($B_i$) having a value of 60 are outputted as an output t' (t' in FIG. 13) of ROM 1206. Further, ROM 1207 extends compressed data of m (=4) bits to data of n+1 (=8) bits according to the characteristics indicated in FIG. 3 explained above. In the same way as described above, When the output s' of the data latch 1205, which are compressed differential signals, are given thereto as an address, differential data ($B_{4i-1}$) extended to 8 bits are outputted therefrom, as an output u' (u' in FIG. 13).

The outputs t' and u' of ROMs 1206 and 1207 are inputted to the adder 1208 and the adder 1209, respectively, where the reference sampled data ($A_{4i}$), which are the output r' of the data latch 1204, is added thereto. The adder 1208 and the adder 1209 effect operations represented by Eq. (4) stated above, and in this way the sampled data, which have been differential-coded by the coder are decoded. The outputs v' and w' (v' and w' in FIG. 13) of the adders 1208 and 1209 are inputted in the data latches 1210 and 1212, respectively. Further, the output w' of the adder 1209 is inputted also in the interpolated value calculating device 1213.

The data latches 1210 to 1212 latch the input data with a period of $4\tau$ ($\tau$ being the sampling period). The output thereof is delayed by $4\tau$ with respect to the respective input data. Therefore the outputs x', y' and z' of the data latches 1210, 1211 and 1212 are indicated by x', y' and z' in FIG. 13, respectively. These outputs x', y' and z' of the data latches 1210 to 1212 are inputted to the data selector 1214 and at the same time to the interpolated value calculating device 1213.

The interpolated value calculating device 1213 is the same as the interpolated value calculating device 116 or 416 in the embodiment indicated in FIGS. 1 and 4, and the output thereof $\alpha'$ has a value ($E_{4i+1}$) based on Eq. (3) stated above, as indicated by $\alpha'$ in FIG. 13. In this embodiment this interpolated value ($E_{4i+1}$) is used as $A_{4i+1}$ in lieu of the sampled data, which are not coded. The output $\alpha'$ of the interpolated value calculating device 1213 is inputted into the data selector 1214. The data selector 1214 outputs the outputs x', y', z' and $\alpha'$ of the data latches 1210 to 1212 and the interpolated value calculating device 1213, respectively, one after another in the original order with the original interval through the decoded signal output terminal 1215. This output $\delta^*$ is a signal having the order before the coding and the sampling period $\tau$, and the number of bits is also restored to n (=7), as indicated by $\delta^*$ in FIG. 13.

According to this invention, as explained in the embodiment described above, decoding with only small errors is possible, even in the case where the interpolation method in the decoder is restricted for the sampled data, which is not coded, and the effect of the reduction of the number of bits is great. In this case also it is possible to combine the method, by which M lines having a great image correlation are brought together into a set and sampled data are thinned out so that transmitted sampled data do not overlap each other, with the method described above. For example, in the case where M=2, the output n* of the data selector 911 in FIG. 9 is as indicated by n*' in FIG. 10B on one of predetermined two lines and by n*'' in FIG. 10B on the other line. For example, on one of the lines only $A_{4i}$ among $C_{4i-1}$, $A_{4i}$ and $C^*_{4i+2}$, and similarly on the other line only $C'_{4i-1'}$ and $C^{*'}_{4i+2}$ among $C'_{4i-1'} A_{4i}$ and $C^{*'}_{4i+2}$ are outputted. Here, by the method explained in this embodiment, the number of bits of $A_{4i}$ and the sum of the numbers of bits of $C_{4i-1}$ and $C_{4i+2}$ are different. Therefore, in order to make the signal transmission rate uniform, it is preferable that e.g. the reference sampled data ($A_{4i}$) and the compressed and coded sampled data ($C_{4i-1}$ and $C^*_{4i+2}$) be arranged alternately in each of the lines, as indicated by n*' and n*'' in FIG. 10B. However, in the case where the number of bits of transmitted sampled data, which are thinned out among the M lines, does not vary, as in the embodiment indicated in FIGS. 1 and 4 ($A_{4i}$ and $F_{4i+1}$ consist in total of 8 bits and $C_{4i-1}$ and $C_{4i+2}$ consist also in total of 8 bits), it is not always necessary to arrange data alternately, as indicated by n' and n'' in FIG. 2, but it is also possible that one of the lines transmits only the reference sampled data ($A_{4i}$) and the optimum interpolation flag ($F_{4i+1}$) and the other line transmits only the compressed and coded sampled data ($C_{4i-1}$ and $C_{4i+2}$).

The coding method according to this invention, which is described in the above embodiment, can be applied as it is, whether the video signal is a composite signal or a component signal. Further it is a matter of course that it is applicable to the case where the sampling is effected by a subnyquist sampling. For the composite signal it is efficient also to construct the set of N sampled data to be dealt with to be coded by sampled data in phase taken out with the period of the color subcarrier from data successively sampled with a period which is four times as long as the period of the color subcarrier and to divide them into four groups in phase, because the correlation of the image signal can be utilized with a high efficiency. Furthermore, an effect can be obtained by applying this invention to a signal according to a method by which a set is formed for every two lines and a composite signal is transmitted or recorded after having divided it by adding and subtracting operations into a signal consisting principally of the brightness signal component and a signal consisting principally of the chromaticity signal component, so-called sum and difference separating method. In this case it is possible to increase the effect by varying the number of coding bits and compressing and extending characteristics for the sum signal and the difference signal, etc. In this case, when data are thinned out among the M lines, it is desirable that all the M lines to be combined are sum signals or difference signals.

Although the sampled data, which are not coded, are included in the set of N sampled data in the embodiment described above, an effect can be obtained to reduce the number of bits per pixel without diminishing the image quality by only coding all the sampled data and thinning them out among the M lines. For this purpose the data selector 911 is controlled so that data are thinned out and transmitted by using a delay time of the delay circuit 902 which is equal to $2\tau$ in the coder in FIG. 9 and an interval of taking out data from the latches 904 to 906, which is equal to $3\tau$. In this case three data of $A_{3i-1'} A_{3i}$ and $A_{3i+1}$ are coded to $C_{3i+1'} A_{3i}$ and $C_{3i+1}$. Further, in the decoder indicated in FIG. 12 the interval of taking out data from the data latches 1203 to 1205 and 1210 to 1212 is $3\tau$, and the data selector 1214 is so constructed that three data are successively switched over and outputted. In this case no interpolated value calculating device is necessary. A construction similar to the embodiment indicated in FIG. 6 can be applied to digital VTR, etc. by using a coder and a decoder having such a construction and an interpolating device as indicated in FIG. 7 (the waveform of the working signal in FIG. 7 being as indicated in FIGS. 14A and 14B). Further, in this case, it is possible also that ROMs 909 and 1206 are identical to ROMs 910 and 1207, respectively and the two numbers of compressing and coding bits ar equal. FIGS. 14A and 14B show waveforms of working signals in various parts of the interpolating device indicated in FIG. 7, in the case where the reference sampled data ($A_{3i}$) are coded with seven bits and the compressed and coded sampled data ($C_{3i-1'} C_{3i+1}$) are coded with four bits, respectively. According to this method the reference sampled data ($A_{3i}$) and the compressed and coded sample data ($C_{3i-1'} C_{3i+1}$) are written alternately for every two successive addresses in the memories 703 and 704 in FIG. 7, respectively (refer to n', aa, bb in FIG. 14A) and on the reading side addresses, which are distant by two frames from each other, are read out alternately for every two successive addresses (refer to aa, bb, o''', o'' in FIG. 14B). In this way, by representing the output signal of the data selector 707 by o', data (o' in FIG. 14B) interpolated between M (=2) lines are obtained. Further, in the example described above, since the number of bits of the reference sampled data ($A_{3i}$), which is seven, and that of the compressed and coded sampled data ($C_{31-1'} C_{3i+1}$), which is eight, are different, the memory utilization efficiency is improved rather, e.g. if the memory 703 has a 7-bit structure, in which all the reference sampled data ($A_{3i}$) are stored, and all the compressed coded sampled data ($C_{3i-1'} C_{3i+1}$) are stored in the other memory 704. The work of the interpolating device indicated in FIG. 7 and the waveform in various part therein in this case are almost identical to those indicated in FIGS. 8A and 8B shown previously, and they differ from the latter only in that there are no signals such as $F_{4i+1'} F'_{4i-3'}$ etc. and the numbers in the suffix of the signals are changed. Therefore explanation thereof in detail will be omitted.

Now, although the case where the reference sample data and the sampled data are one, respectively, among N sampled data to be coded is described in the embodiments above, they may be plural. Further, although there are a plurality of compressed and coded sampled data in all the embodiments described above, there may be also only one.

FIGS. 15 to 17 show examples of the structure of the set of N sampled data to be dealt with to be coded other than those explained in the embodiments described above. In FIGS. 15 to 17, V indicates an image signal; sampled data indicated by a mark o are the reference sampled data coded with n bits; sampled data indicated by a mark Δ are the compressed and coded sampled data coded with m or l bits (n>l>m); and sampled data indicated by a mark x are the sampled values, which are not coded.

FIG. 15 shows an embodiment, in which N=5. There are two reference sampled data and two compressed and coded sampled data ($A_{5i}$ $A_{5i+2}$ and $A_{5i-1'}$ $A_{5i+3}$) among a set of five sampled data, and the remaining one ($A_{5i+1}$) is not coded. In this example, in order to reduce interpolation errors, the sampled data are so constructed that the sampled data, which are adjacent, on the left and right sides, to the sampled data ($A_{5i+1}$), which are not coded and interpolated at the decoding, are the reference sampled data. Further, although the reference sampled data in the set of N sampled data are used as the predicted value for the compression and coding in the embodiments indicated in FIGS. 1, 4, 9 and 12, it is efficient also for reducing coding errors to obtain an interpolated value by using two reference sampled data $A_{5i+2}$ and $A_{5i+5}$ for sampled data such as $A_{5i+3}$ and $A_{i+4}$ in FIG. 15.

FIG. 16 shows an embodiment, in which N=8. There are two sampled data, which are not coded. ($A_{8i}$, $A_{8i+5}$ and $A_{8i+1}$, $A_{8i+4}$) among a set of 8 sampled data, and the remaining four ($A_{8i-1}$, $A_{8i+2}$, $A_{8i+3}$, $A_{8i+6}$) are compressed and coded.

FIG. 17 shows an embodiment, in which N=3. A set of three sampled data consists of the reference sampled data ($A_{3i}$), the compressed and coded sampled data ($A_{3i+1}$) and the sampled data ($A_{3i+1}$), which are not coded, each of which is one.

In all the examples stated above, in order to increase the interpolation precision, the reference sampled data are located adjacent to the sampled data which are not coded. Further attention is paid so that more than two sampled data which are not coded are not located in succession. In addition, since the sampled data are so arranged that more than two coded sampled data are between sampled data which are not coded, high precision interpolation by means of the interpolated value calculating device 1213 is possible, which was explained in the embodiments indicated in FIGS. 4 and 12.

Figure 18:
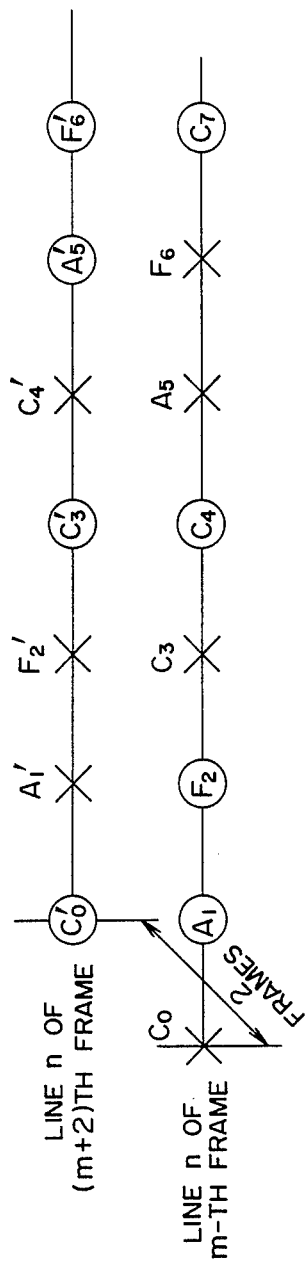

According to this invention, as explained in the embodiment indicated in FIG. 6, in order to reduce significantly the number of bits per pixel, M image signal lines are brought into a set, and sampled data are thinned out so that transmitted sampled data do not overlap each other between different lines. In the embodiments indicated in FIG. 6, it was assumed that the image signals dealt with were NTSC composite signals and the same image signal lines which were distant by two frames from each other were combined. This arrangement of the sampled data can be represented as indicated in FIG. 18. That is, as indicated in FIG. 18, while for the line n of the m-th frame, only $A_1$ and $F_2$ among the sampled data ($C_0$, $A_1$, $F_2$, $C_3$) or the flag (hereinbelow called simply data) and only $C_4$ and $C_7$ in the data ($C_4$, $A_5$, $F_6$, $C_7$) are transmitted, for the line n of the (m+2)th frame, which is distant by two frames therefrom, only $C'_0$ and $C'_3$ among the data ($C'_0$, $A'_1$, $F'_2$, $C'_3$) and only $A'_5$ and $F'_6$ among the data ($C'_4$, $A'_5$, $F'_6$, $C'_7$) are transmitted. The interpolation can be effected between these two lines which has a great image correlation and the same phase of the color subcarrier.

These image signal lines combined for the thinned out transmission are not necessarily distant by two frames from each other. However, in this case, interpolation errors are large for a moving image. For a signal, whose phase of the color subcarrier is in accordance with that of the frame which is distant by four frames therefrom, such as a composite signal of the PAL system, it is desirable to combine two image signal lines which are distant by four frames from each other. For a component signal, since there is no color subcarrier, it is not necessary to take the phase into account. Consequently, good characteristics can be obtained by effecting the interpolation between two lines which are distant by one frame from each other.

Figure 19:
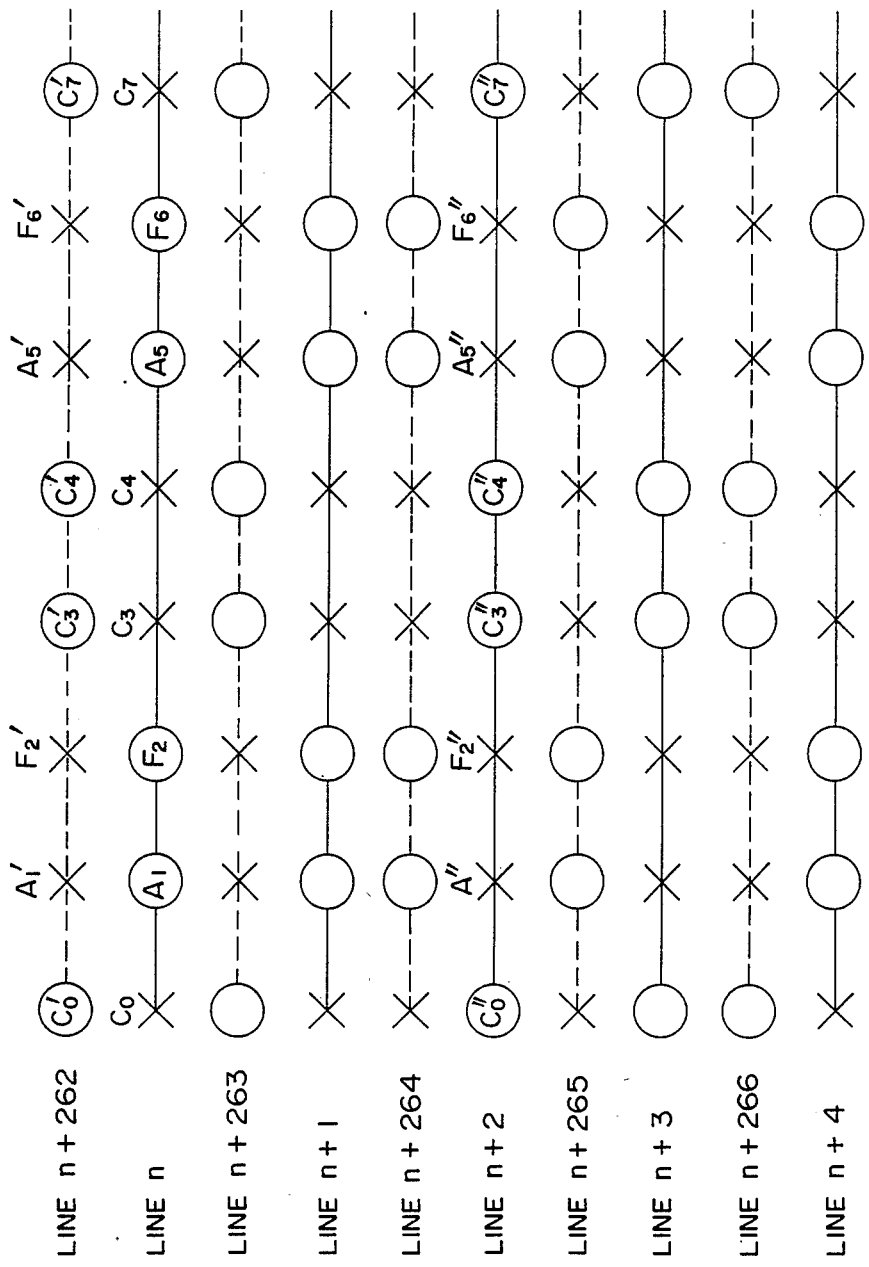

Furthermore, the set of sampled data for thinning out and transmission may be constructed also between different fields, as indicated in FIG. 19. FIG. 19 shows an embodiment, in which sampled data are thinned out between a line n and another n+262, i.e. between image signal lines belonging to two fields, which are adjacent to each other, of an NTSC composite signal.

For the line n only $A_1$ and $F_2$ among the data ($C_0$, $A_1$, $F_2$, $C_3$) and only $A_5$ and $F_6$ among the data ($C_4$, $A_5$, $F_6$, $C_7$) are transmitted. On the other hand, for the line N+262, whose phase of the subcarrier is in accordance with that of the first in the adjacent field, only $C'_0$ and $C'_3$ among the data ($C'_0$, $A'_1$, $F'_2$, $C'_3$) and only $C'_4$ and $C'_7$ among the data $C'_4$, $A'_5$, $F'_6$, $C'_7$) are transmitted. The interpolation can be effected between these lines. In the example indicated in FIG. 19, transmitted data in the same field are switched over for every two lines. For example, for the line n+2 in the figure, only $C''_0$ and $C''_3$ among the data ($C''_0$, $A''_1$, $F''_2$, $C''_3$) and only $C''_4$ and $C''_7$ among the data ($C''_4$, $A''_5$, $F''_6$, $C''_7$) are transmitted. In this way the interpolation can be effected within a field, such as between a line n and another line n+2. This method can be applied to the component signal. In this case the switching over of transmitted data is effected for every line and the interpolation is effected between two lines which are adjacent to each other. However, when the interpolation is effected between different lines within the same field, there is a disadvantage that the vertical resolving power is lowered.

Figure 20:
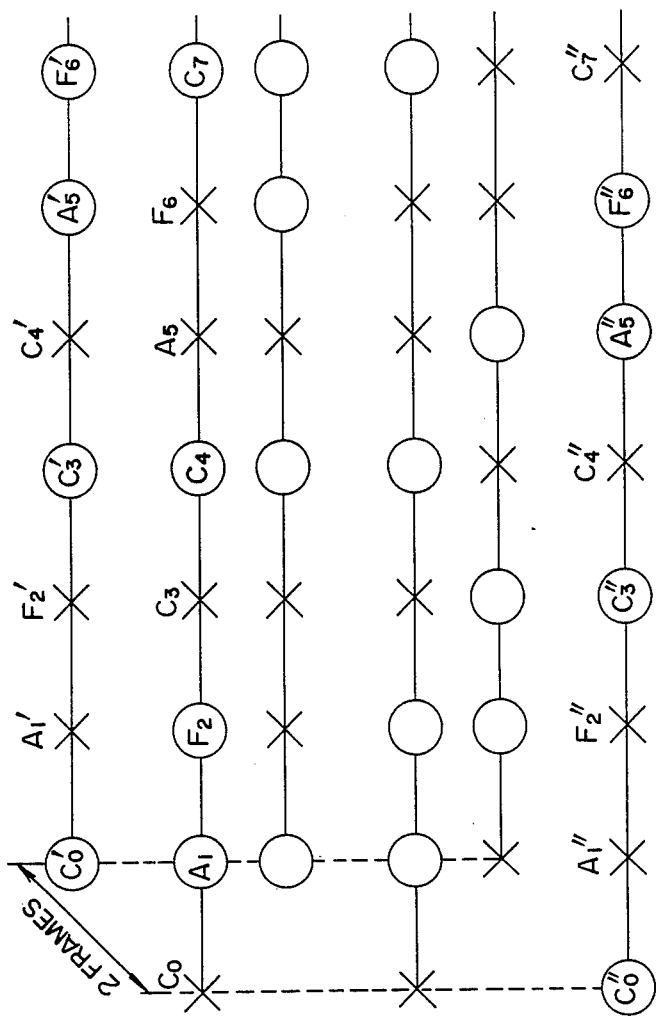

Therefore, as indicated in FIG. 20, in addition to the example indicated in FIG. 18, e.g. for the NTSC composite signal data are switched over for every two lines within the same frame and the interpolation can be effected between the line n of the m-th frame and the line n of the (m+2)-th frame, which are distant by two frames from each other, for a still image and between the line n and the line n+1 within the m-th frame for a moving image.

Although all the sampling phases were in accordance with each other within a field or between different fields in the examples indicated in FIGS. 18 to 20 described above, it is possible to prevent the compressed and coded sampled data, having relatively great coding errors, or sampled data, which are not coded and have therefore interpolation operation errors, from being arranged on a vertical line, which will result in a stripe-shaped image being formed, which deteriorates the image quality. This is done, e.g., by shifting the coding phase between either adjacent fields or adjacent lines, or both between adjacent fields and between adjacent lines, as indicated by an example in FIG. 21.

Figure 21:
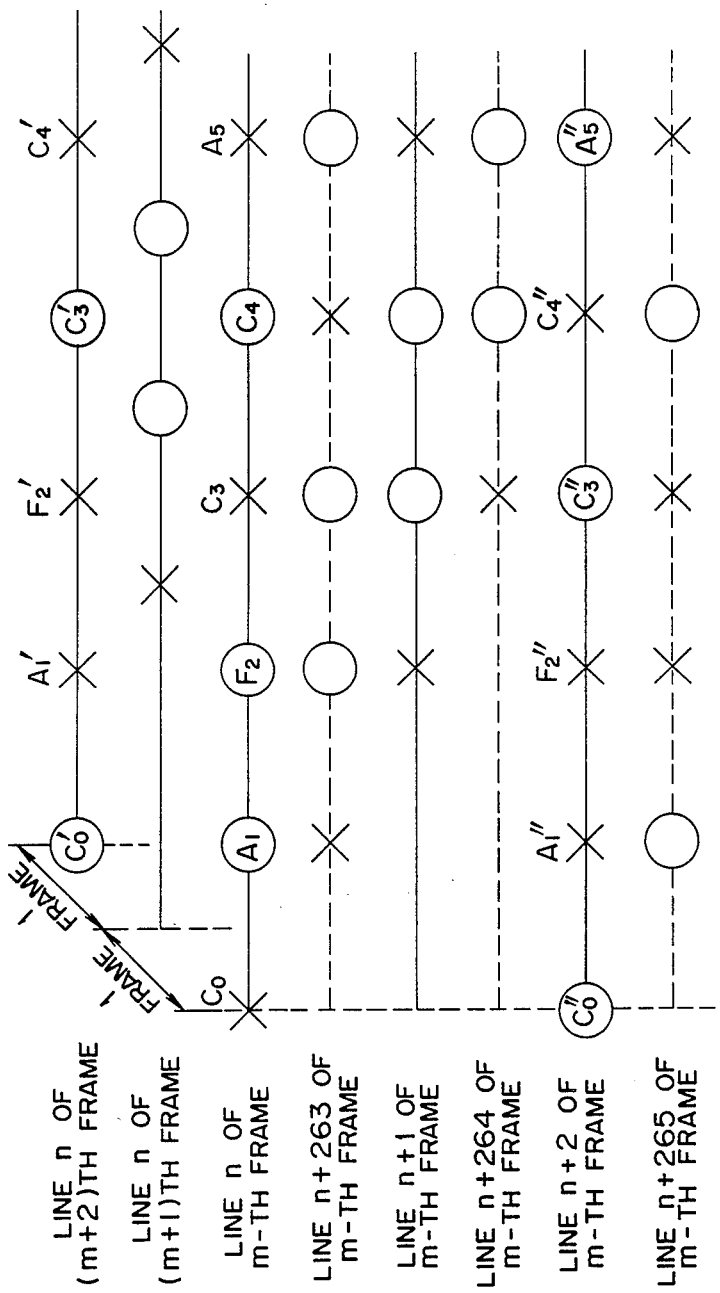

In the embodiment indicated in FIG. 21 the position of the pixel, at which the sampling is started, is shifted by two sampling periods before and behind for every line within a field such as between the line n of the m-th frame and the line n+1 of the m-th frame, and by one sampling period between fields such as between the line n of the m-th frame and the line n+263 of the m-th frame (i.e. by two sampling fields between frames). Between fields, since the position is shifted by four sampling periods for every four fields, in the case where the magnitude N of a set of sampled data to be dealt with to be coded is four as in this embodiment, the position of the pixel, at which the sampling is started, return to the initial position for every four fields (i.e. here for every two fields), as indicated in FIG. 21. In this way the interpolation can be effected e.g. between the line n of the m-th frame and the line n of the (m+2)-th frame or between the line n of the m-th frame and the line n+2 of the m-th frame in FIG. 21.

Although the position where the sampling is started is decided in units of a sampling period in the example indicated in FIG. 21, this is not always necessary, but it is also valid to decide it in units of a half sampling period. Further, although all the examples indicated in FIGS. 18 to 21 relate to the method by which the interpolation is effected between two lines (i.e. M=2), this invention is not restricted thereto, but it is valid, if the value of M is varied, i.e. if the interpolation is effected among three or four lines, and it is possible to increase further the reduction ratio of the number of bits per pixel with increasing value of M.

Next another embodiment of this invention will be explained below. This embodiment relates to a coding device, in which one of N sampled data brought together into one group is coded with n bits, and the other sampled data are transmitted after having been compressed and coded with a number of bits m, which is smaller than n, by forming more than two predicted values for each of them and by selecting the one of them which is the closest to the real sample data.

Figure 22:
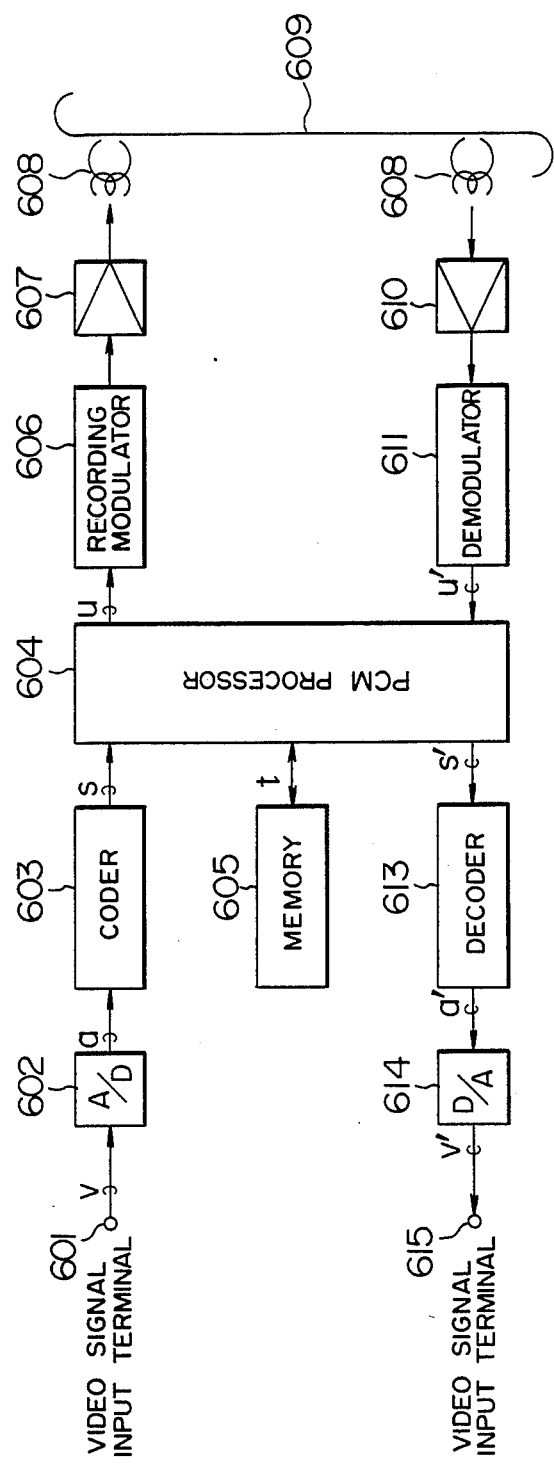
FIG. 22 is a block diagram illustrating an example of still another coding device to which this invention is applied.

FIG. 22 shows an example, in which such a coding device is applied to a magnetic recording/reproducing device such as a VTR, etc., represented by a block diagram corresponding to that indicated in FIG. 6. Comparing FIG. 22 with FIG. 6, it can be seen that the former differs from the latter only in that the data interpolating device 612 is not disposed in the former, and corresponding items are represented by the same reference numerals, and explanation therefor will be omitted.

Figure 23:
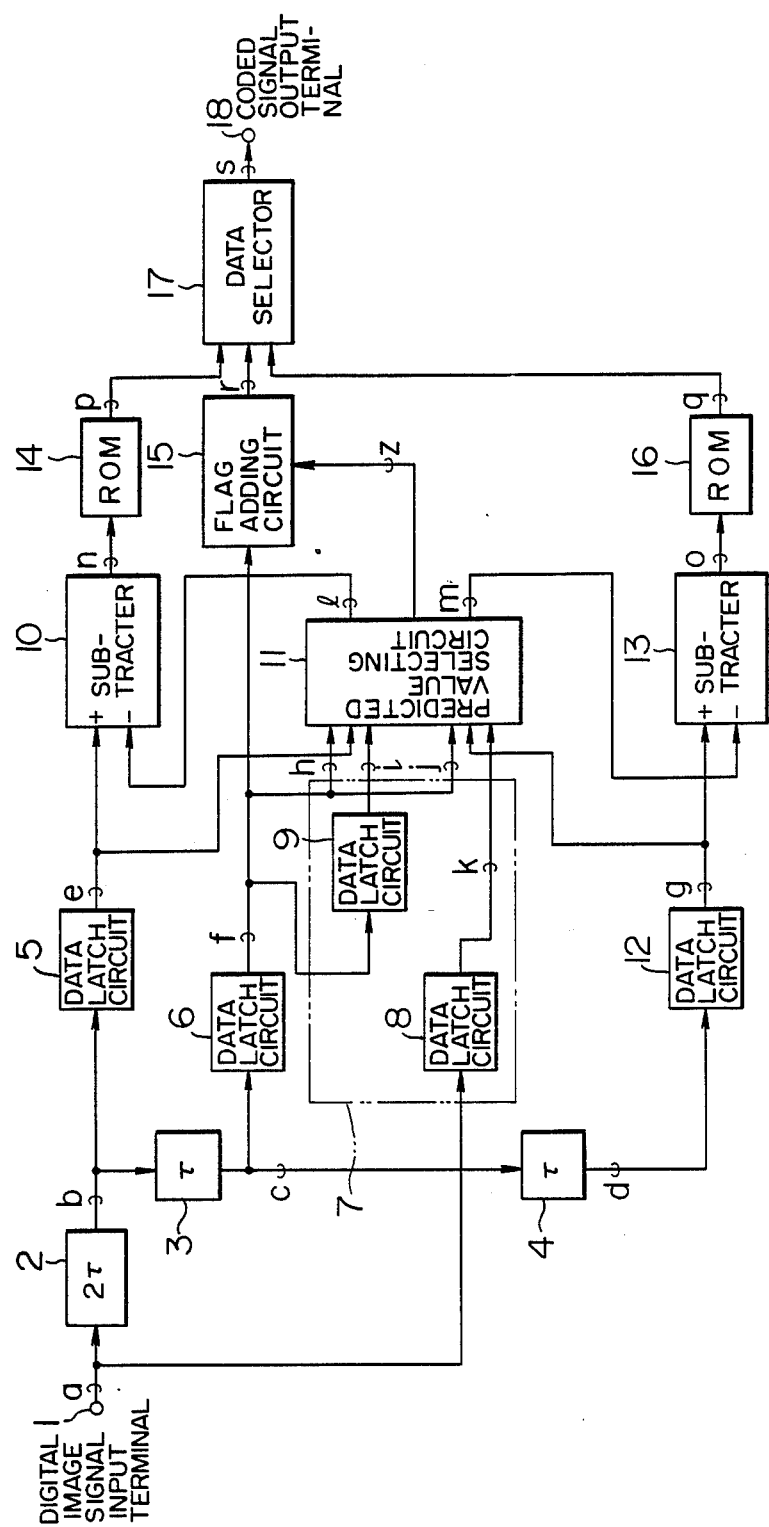
FIG. 23 is a block diagram illustrating an embodiment of the coding device according to this invention applied to the device indicated in FIG. 22.

This embodiment relates to the coder 603 indicated in FIG. 22 and the construction thereof is illustrated in detail in FIG. 23, in which reference numeral 1 is an input terminal; 2, 3 and 4 are delay circuits; 5, 6, 8, 9 and 12 are data latch circuits; 7 is a predicted value calculating circuit; 10 and 13 are subtracters; 11 is a predicted value selecting circuit; 14 and 16 are ROMs (read only memory); 15 is a flag adding circuit; 17 is a data selector; and 18 is an output terminal.

FIG. 24 shows the timing of signals in different parts of the circuit indicated in FIG. 23. That is, the timings of the signals in the parts indicated by a, b, c, ... in FIG. 23 are represented by the corresponding small letters a, b, c, ..., respectively. Hereinbelow the work of the circuit in the embodiment of this invention will be explained, referring to FIGS. 23 and 24.

In FIG. 23 a digital video signal a (a in FIG. 24) of n (=7) bits, which is successively quantized for every period $\tau$ is inputted through the input terminal 1, one of the a representing one of the sample data.

According to this invention, successive sample data are divided into N successive sample data (N being an integer greater than two), which form one group, for which coding processing is executed. In this embodiment a case where N=3 will be explained. Further the video signal dealt with in this embodiment is a composite video signal according to the NTSC system, in which usually the chromaticity signal is superposed on the brightness signal.

Before explaining the work of the circuit indicated in FIG. 23 the working principle (working principle of the coding and the decoding) of this invention will be explained at first, referring to FIGS. 25A and 25B.

Figures 25A, 25B:
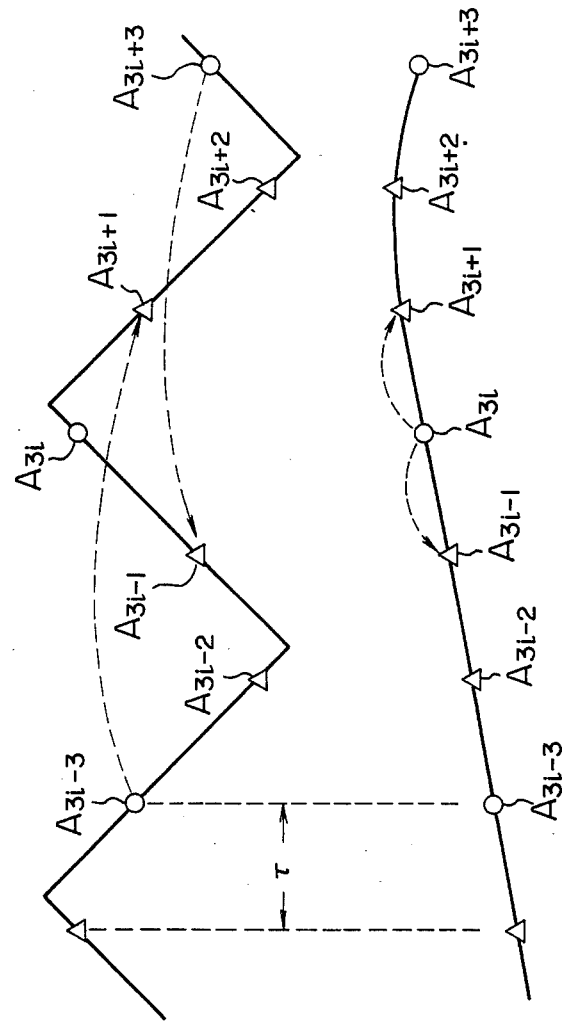
FIGS. 25A and 25B show waveforms for explaining the principle of the operation of the device indicated in FIG. 23.

FIG. 25A shows the waveform of a composite video signal, in which the chromaticity signal is superposed on the brightness signal and which has a great color saturation degree, i.e. which has the color subcarrier having a great amplitude, while FIG. 25B shows the waveform of the composite video signal, which has a small color saturation degree, i.e. which has the color subcarrier having a small amplitude.

Further, in this embodiment the sampling frequency is assumed to be $4f_{sc}$, $f_{sc}$ being the frequency of the color subcarrier of the composite video signal, which is dealt with. (Consequently, the sampling period $\tau = 1/(4 f_{sc})$.)

In this embodiment three samples ($A_{3i-1}$, $A_{3i}$, $A_{3i+1}$), as indicated in FIGS. 25A and 25B, are taken out from such a video signal as a group of samples. Among these samples the sample $A_{3i}$ indicated by a mark o is coded with n (=7) bits as the reference sample, and for each of the other remaining samples $A_{3i-1}$ and $A_{3i+1}$, indicated by marks $\Delta$, predicted values are obtained on the basis of the reference sample $A_{3i}$, and the difference between one of the predicted values and each of them is compressed and coded. For each of the remaining samples $A_{3i-1}$ and $A_{3i+1}$ a plurality of predicted values are obtained. The process identical to that effected in reality at the decoding (hereinbelow this process being called a provisional decoding) is effected at the coding by using these predicted values, and the compression and coding described above is effected by selecting one of them capable of giving provisionally decoded data, which are the closest to the original sampled data. In this embodiment two predicted values are obtained for each of the samples, which are to be compressed and coded.

That is, for the signal having a great color saturation degree indicated in FIG. 25A, since the predicted value for which it is believed that errors due to the compression and the extension are small, i.e. such a predicted value as the sample $A_{3i-1}$, should have a sample value at a level as close as possible thereto, taking the waveform into account $A_{3i+3}$ is suitable as the predicted value $B'_{3i-1}$ for $A_{3i+1}$, and $A_{3i-3}$ is suitable as the predicted value $B'_{3i+1}$ for $A_{3i+1}$.

On the other hand, for the signal having a small color saturation degree indicated in FIG. 25B, it is thought that for the predicted value for which it is believed that errors due to the compression and the extension are small, $A_{3i}$ is suitable both as the predicted value $B''_{3i-1}$ for the sample $A_{3i-1}$ and as the predicted value $B''_{3i+1}$ for the sample $A_{3i+1}$. That is, ($B''_{3i-1} = B''_{3i+1} = A_{3i}$).

That is, it is because, when a predicted value which is as close as possible to the original sample value is selected, errors are small, as they also are when the difference therebetween is compressed and extended.

When the composite video signal includes signals having a great degree of saturation, as indicated in FIG. 25A, for the reason stated above for the original sampled value $A_{3i+1}$ the sample ($A_{3i-3}$) advanced by one period with respect thereto, i.e. four samples before it, is selected as the predicted value, and for the original sampled value $A_{3i-3}$, the sample ($A_{3i+3}$) retarded by one period with respect thereto, i.e. four samples behind it, is selected as the predicted value. Likewise, when the composite video signal includes signals having a low degree of saturation, as in the case of FIG. 25B, for the same reason for the original sampled value $A_{3i+1}$ the sample $A_{3i}$, which is adjacent thereto on the left side, is selected as the predicted value, and for the original sampled value $A_{3i-1}$ the sample $A_{3i}$, which is adjacent thereto on the right side, is selected as the predicted value.

That is, in the case where the composite video signal dealt with is a signal having a great color saturation degree, it is preferable to select a sample shifted by one period, i.e. distant by just four samples therefrom, as the predicted value, and in the case where it is a signal having a small color saturation degree, it is preferable to select a sample which is adjacent to the original sample as the predicted value.

However, since it is usually not known whether the composite video signal dealt with is a signal having a great color saturation degree or a small color saturation degree, at first two samples, one being adjacent to the original sample and the other being shifted by one period, i.e. distant by four samples therefrom, are selected as candidate predicted values for the original sample. Thereafter, the coding and the decoding are effected in reality by using both of them. In this way the one which is found to give smaller errors is selected as the real predicted value.

Hereinbelow the procedure described above will be explained concretely. The provisional decoding is effected by using each of the candidate predicted values. Predicted values $B_{3i-1}$ and $B_{3i+1}$, for which errors from the original sampled value are small, are selected, and the differences therefrom are obtained by using the following equations:

$$\left.\begin{array}{l} C_{3i-1} = A_{3i-1} - B_{3i-1} \\ C_{3i+1} = A_{3i+1} - B_{3i+1} \end{array}\right] \quad (5)$$

These two differential data are compressed and coded with a number of bits m ($<$n).

In this embodiment two differential data $C_{3i-1}$ and $C_{3i+1}$ are coded to compressed differential data $D_{3i-1}$ and $D_{3i+1}$ with m=4 bits, respectively. Further, in this embodiment it is detected at the decoding with which predicted value the coding has been effected, and a flag indicating the selection of the predicted value is transmitted so that the decoding can be effected correctly.

In this embodiment, since the real predicted value is selected between two kinds of predicted values, the number of bits for the flag is one. In this way the number of bits per pixel is 16/3=5.33. The number of bits is reduced by a factor of 16/21 with respect to that required by the method, by which all the bits are decoded with seven bits.

Since it is believed that the working principle is well understood in the above, returning to FIG. 23, the work of the circuit will be explained below.

A digital video signal a (a in FIG. 24) of n (=7) bits inputted through the input terminal a is inputted to the predicted value calculating circuit 7 and to a delay circuit 2. From the delay circuit 2 data b (b in FIG. 24), which are delayed by a time $2\tau$, which is two times as long as the sampling period $\tau$, are inputted to the data latch circuit 5 and at the same time to the delay circuit 3. Data c (c in FIG. 24), which are delayed by a time $\tau$ in the same way in the delay circuit 3, are inputted to the data latch circuit 6 and the delay circuit 4. Further data d (d in FIG. 24), which are delayed by a time $\tau$ in the delay circuit 4, are inputted to the data latch circuit 12. Each of these data latch circuits 5, 6 and 12 and the other data latch circuits 8 and 9 takes out data with an interval $3\tau$, which is three times as long as the sampling period $\tau$, and their outputs e, f, g, i, and k are indicated by e, f, g, i and k in FIG. 24.

The predicted value calculating circuit 7 is composed of e.g. two data latch circuits 8 and 9. Data latch circuit 6 supplies the output data f (f in FIG. 24) to the predicted value selecting circuit 11 as first predicted values h (h in FIG. 24) and j (j in FIG. 24) for the output data e (e in FIG. 24) and g (g in FIG. 24) from the latch circuits 5 and 12, respectively. Predicated value calculating circuit 7 supplies a signal, obtained by delaying the output data f (f in FIG. 24) from the data latch circuit 6 by a time $3\tau$ in the data latch circuit 9, to the predicted value selecting circuit 11 as a second predicted value i (i in FIG. 24) for the output data e (e in FIG. 24) from the data latch circuit 5. Circuit 7 also supplies the output data from the data latch circuit 8, taking out data from the signal a supplied through the terminal 1 with an interval of a time $3\tau$, to the predicted value selecting circuit 11 as a predicted value k (k in FIG. 24) corresponding to the output data g (g in FIG. 24) from the data latch circuit 12.

The output data e (e in FIG. 24) from the data latch circuit 5 and the output data g (g in FIG. 24) from the data latch circuit 12 are supplied also to the predicted value selecting circuit 11. Predicted values for the signals e and g are selected from the first predicted values h and j and the second predicted values i and k. Data l (l in FIG. 24), as a predicted value for the signal e, and data m (m in FIG. 24), as a predicted value for the signal g, are supplied to the subtracters 10 and 13, respectively. At the same time the flag z, indicating the selection of the predicted value, is supplied to the flag adding circuit 15.

The output data e (e in FIG. 24) and g (g in FIG. 24) from the data latch circuits 5 and 12 are supplied to the other inputs of the subtracters 10 and 13. Differential operations are effected between them and the predicted values l and m from the predicted value selecting circuit 11, and differential data n (n in FIG. 24) and o (o in FIG. 24) of n+1 (=8) bits are obtained. The output data n and o from these subtracters 10 and 13 are inputted to ROMs 14 and 16, respectively and are transformed into compressed differential data p and q (p and q in FIG. 24) of m (=4) bits.

The transforming characteristics in ROMs 14 and 16, in the case where n=7 and m=4, are assumed to be identical to those indicated in FIG. 3.

As an example, when the value of n or o (i.e. the value of the differential data $C_{3i-2}$, $C_{3i+1}$ or $C_{3i-4}$, $C_{3i-1}$) is data having a value of 54, as indicated in FIG. 3, data ($D_{3i-2}$, $D_{3i+1}$ or $D_{3i-4}$, $D_{3i-1}$) corresponding to $a_5$ are outputted by ROMs 14 and 16 as data p and q (p and q in FIG. 24). In this way in ROM 14 and 16, the differential data n and o of n+1 (=8) bits are transformed into data p and q of m (=4) bits, respectively, each of which is supplied to one of the inputs of the data selector 17.

The output data f (f in FIG. 24) from the data latch circuit 6 are supplied to the other input of the data selector 17 through the flag adding circuit 15 as the reference sample. The flag adding circuit 15 supplies a flag indicating which is selected among the predicted values coming from the predicted value selecting circuit 11 and data r (r in FIG. 24) of n+1 (=8) bits, obtained by adding 1 bit (e.g. "0" in the case where the first predicted values h and j are selected, and "1" in the case where the second predicted values i and k are selected, as predicted values for the data e and g) to the output signal f coming from the data latch circuit 6, to the data selector 17. The data selector 17 selects alternately the data p and q of m (=4) bits from ROMs 14 and 16 and the data r of n+1 (=8) bits from the flag adding circuit 15, which are outputted through the terminal 18.

Consequently this output s (s in FIG. 24) from the data selector 17 can be expressed by a code in the order of ($D_{3i-1}$, $A'_{3i}$, $D_{3i+1}$), whose numbers of bits correspond to (m, n+1, m), respectively. The other samples are compressed in number of bits in the same way as described above by bringing three samples together in one group and coding them successively as three codes of bits (m, n+1, m). In this way the output signal s obtained by compressing the input signal in number of bits in the coder (coding device) indicated in FIG. 23 is outputted through the terminal 18 and written in the memory 605 through the PCM processor 604 indicated in FIG. 22 described previously.

The data written in the memory 605, compressed in number of bits, a re read out successively through the PCM processor 604, as described above, and the data read out in parallel are transformed successively into serial data, which are outputted as serial data u through the PCM processor 604. This serial data output u is recorded on the magnetic tape 609 by the magnetic head 608 through the modulator 606 and the recording amplifier 607.

Figure 26:
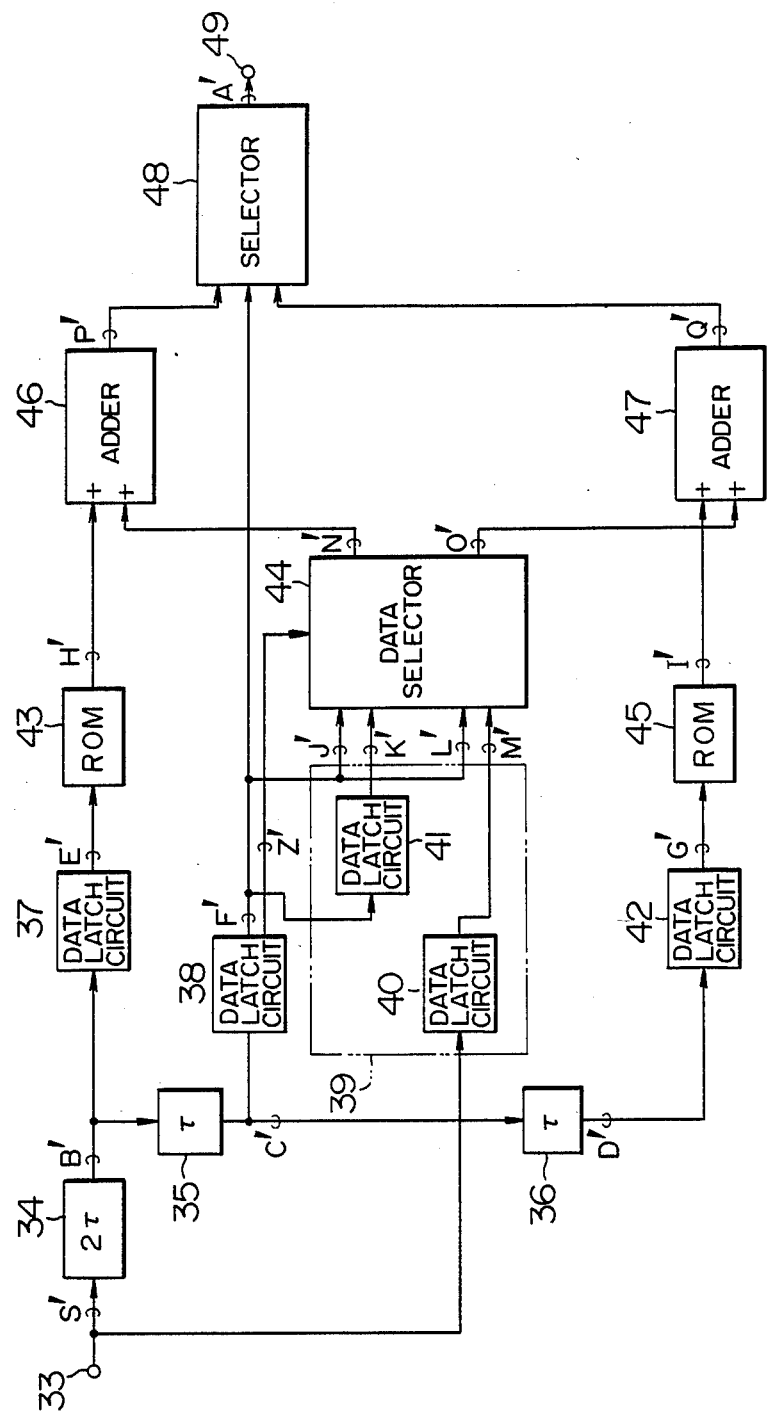
FIG. 26 is a block diagram illustrating a specific example of a decoding device for the coding device indicated in FIG. 23.

Now the decoder 613 in FIG. 22 will be explained. FIG. 26 is a block diagram illustrating the construction of the circuit of the decoder 613. FIG. 27 is a timing chart of signals in various parts of the circuit indicated in FIG. 26.

During reproduction, the data recorded as described above are reproduced by the magnetic head 608 from the magnetic tape 609 and are suitably reproduced and demodulated by the reproduction equalizer 610 and the demodulator 611. In this way a serial data output u', which is similar to the data output u described above, is obtained from the demodulator 611.

This serial data output u' is transformed into parallel data through the PCM processor 604, and the parallel data are written successively in the memory 605. An output signal s', which is similar to the output signal s from the coder 603, is obtained from the PCM processor 604 and this output signal s' is supplied to a terminal 33 of the decoder 613 indicated in FIG. 26.

The output data S' (s' in FIG. 27) inputted through the terminal 33 in FIG. 26, which have been outputted by the PCM processor 604, are supplied to a predicted value calculating circuit 39 and a delay circuit 34. The data B' (b' in FIG. 27), delayed by a time $2\tau$ in the delay circuit 34, are inputted to a data latch circuit 37 and a delay circuit 35. The data C' (c' in FIG. 27), delayed similarly by a time $\tau$ in the delay circuit 35, are inputted to a data latch circuit 38 and a delay circuit 36. The data D' (d' in FIG. 27), delayed further by a time $\tau$ in a delay circuit 36, are inputted to a data latch circuit 42. Data E' and G' (e' and g' in FIG. 27), obtained by taking out data with an interval $3\tau$ from the data latch circuits 37 and 42, are supplied to ROMs 43 and 45, respectively, as address signals of m (=4) bits.

The data E' and G' ($D_{3i-2}$, $D_{3i+1}$ of e' and $D_{3i-4}$, $D_{3i-1}$ of g' in FIG. 27) of m (=4) bits, outputted by the data latch circuit 37 and 42, are transformed into data H' and I' ($C'_{3i-2}$, $C'_{3i+1}$ of h' and $C'_{3i-4}$, $C'_{3i-1}$ of i' in FIG. 27) of n+1 (=8) bits according to the characteristics indicated in FIG. 3 stated above in ROMs 43 and 45, respectively. As an example, as indicated in FIG. 3, in the case where the output data E' or G' from the data latch circuit 37, 42 correspond to $a_5$, the data H', I' having a value of 54 are outputted by ROM 43, 45. The output data H' and I' transformed in this way into n+1 (=8) bits are supplied to one of the inputs of the adders 46 and 47.

On the other hand the predicted value calculating circuit 39 is composed of two data latch circuits 40 and 41 e.g. just as in the case of the coder indicated in FIG. 23. The output data F' (f' in FIG. 27) of n (=7) bits, obtained by removing one bit of the flag Z, indicating which predicted value is selected in order to code the samples other than the reference sample at the coding from the output signal of n+1 (=8) bits from the data latch circuit 38, are supplied to a data selector 44 as the first predicted values J' and L' (j' and l' in FIG. 27) corresponding to the output data H' and I' (h' and i' in FIG. 27) of ROMs 43 and 45. On the other hand, data obtained by delaying the output data F' (f' in FIG. 27) from the data latch circuit 38 by a time $3\tau$, in the data latch circuit 41 are supplied to the data selector 44 as the second predicted value K' (k' in FIG. 27) corresponding to the output data H' (h' in FIG. 27) from ROM 43, and the output data from the data latch circuit 40, obtained by taking out data with an interval of time $3\tau$ from the data S' supplied through the terminal 33, are supplied to the data selector 44 as the second predicted value M' (m' in FIG. 27) corresponding to the output data I' (i' in FIG. 27) from ROM 45.

The data selector 44 selects one among the predicted values J' and K' corresponding to the supplied output data H' from ROM 43 and one among the predicted values L' and M' corresponding to the output data I' from ROM 45, depending on the flag Z indicating which predicted value has been selected at the coding, which is the output data from the data latch circuit 38, and outputs them. For example, as the predicted values corresponding to the output data H' and I' from ROMs 43 and 45, the first predicted values J' and L', in the case where the flag Z=0, and the second predicted values K' and M', in the case where the flag Z=1, are selected and outputted as the data N' and O' (n' and o' in FIG. 27), respectively.

The predicted values N' and O' selected and outputted from the data selector 44 are supplied to the other inputs of the adders 46 and 47, respectively, and the original samples are restored by effecting the operations indicated by the following equations corresponding to Eq. (5) stated previously:

$$\left.\begin{aligned} A_{3i-1} &= B_{3i-1} + C'_{3i-1} \\ A_{3i+1} &= B_{3i+1} + C'_{3i+1} \end{aligned}\right\} \quad (6)$$

where $B_{3i-1}$ and $B_{3i+1}$ are predicted values and $C'_{3i-1}$ and $C'_{3i+1}$ are extended differential data.

P' and Q' (p' and q' in FIG. 27), restored by the adders 46 and 47, respectively, are supplied to the inputs of the data selector 48. The data F', obtained by removing 1 bit of the flag Z from the data latch circuit 38, are supplied to the other input of the data selector 48. The output data P' and Q' from the adders and the output data F' from the data latch circuit 38 are alternately selected and outputted by the data selector 48, and the resulting data A' (a' in FIG. 27), which are identical to the original data A, are outputted through the terminal 49. The data A' outputted through the terminal 49 are converted into an analogue signal by the D/A converter 614 and the original image signal V' is restored and outputted through the terminal 615.

Figure 28:
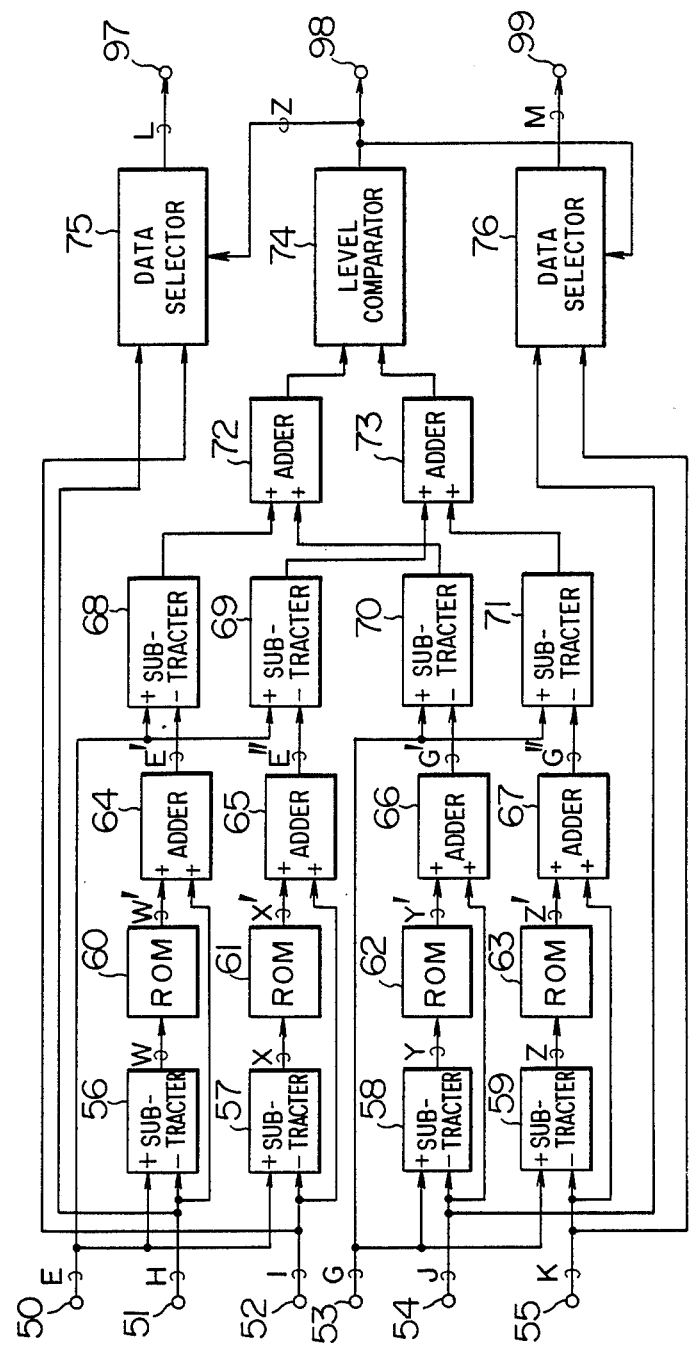
FIG. 28 is a block diagram illustrating a specific example of the predicted value selecting circuit of FIG. 23.

Next the predicted value selecting circuit 11 in FIG. 23 will be explained below. FIG. 28 is a block diagram illustrating a concrete example of such a predicted value selecting circuit 11. FIG. 29 is a timing chart of signals in various parts of the circuit indicated in FIG. 28.

The original sampled data E and G ($A_{3i+1}$ and $A_{3i-1}$ of e and g in FIG. 29), coming from the data latch circuits 5 and 12 and inputted through the terminals 50 and 53, are supplied to one of the inputs of each of subtracters 56, 57 and each of subtracters 58, 59, respectively. The first predicted value H ($B'_{3i-2}$ and $B'_{3i+1}$ of h in FIG. 29), for the data E from the data latch circuit 6 inputted through a terminal 51, is supplied to the other input of the subtracter 56, and the second predicted value I ($B'_{3i-2}$ and $B''_{3i+1}$ of i in FIG. 29), for the data E from the data latch circuit 9 inputted through a terminal 52, is supplied to the other input of the subtracter 57.

In the same way, the first predicted value J ($B'_{3i-4}$ and $B'_{3i-1}$ of j in FIG. 29), for the data G from the data latch circuit 6 inputted through a terminal 54, is supplied to the other input of the subtracter 58, and the second predicted value K ($B''_{3i-4}$ and $B''_{3i-1}$ of k in FIG. 29), for the data G from the data latch circuit 8 inputted through a terminal 55, is supplied to the other input of the subtracter 59. In each of the subtracters 56, 57, 58 and 59 a differential operation between the first or the second predicted value and the respective sample data is effected, and differential data W, X, Y and Z of n+1 (=8) bits (w, x, y and z in FIG. 29) are obtained. These output data W, X, Y and Z coming from the subtracters 56, 57, 58 and 59 are supplied to ROMs 60, 61, 62 and 63, respectively, as signals of n+1 (=8) bits. The data W, X, Y and Z of n+1 (=8) bits outputted by the subtracters 56, 57, 58 and 59 are transformed into data W', X', Y' and Z' (w', x', y' and z' in FIG. 29) of n+1 (=8) bits, respectively, i.e. the number of bits remaining the same, according to the characteristics indicated in FIG. 3 stated previously, in ROMs 60, 61, 62 and 63.

This procedure corresponds to the fact that two steps of transforming the differential data of n+1 (=8) bits into compressed differential data of m (=4) bits by ROMs 14 and 16 in the coder indicated in FIG. 23 and transforming these compressed differential data of m (=4) bits into differential data of n+1 (=8) bits by ROMs 43 and 45 in the decoder in FIG. 26 have been carried out at a stroke.

These output data W', X', Y, and Z' coming from ROMs 60, 61, 62 and 63 are subjected to adding operations, i.e. provisionally decoded, with the predicted values H, I, J and K in the adders 64, 65, 66 and 67. The adder 64 outputs the provisionally decoded data E' (e' in FIG. 29) for the data E, when the first predicted value H is used, and the adder 65 outputs the provisionally decoded data E" (e" in FIG. 29) for the data E, when the second predicted value I is used.

In the same way, the adder 66 outputs the provisionally decoded G' (g' in FIG. 29) for the data G, when the first predicted value J is used, and the adder 67 outputs the provisionally decoded data G" (g" in FIG. 29) for the data G, when the second predicted value K is used. These predicted values E', E", G' and G" from the adders 64, 65, 66 and 67 are inputted to one of the inputs of the subtracters 68, 69, 70 and 71, which execute differential operations between the respective predicted values and the original sampled data supplied to the other of the inputs of the subtracters 68 and 69 and the original data G supplied to the other of the inputs of the subtracters 70 and 71, respectively.

These differential outputs from the subtracters 68, 69, 70 and 71 indicate errors between the provisionally decoded data obtained by using the respective predicted values and the original data. The differential outputs of the subtracters 68 and 70, which are errors when the first predicted value is used, are supplied to an adder 72, while the differential outputs of the subtracters 69 and 71, which are errors when the second predicted value is used, are supplied to an adder 73.

The outputs of the adders 72 and 73 are supplied to a level comparator 74 which provides an output of, for example, "0", when the output level of the adder 72 is lower than the output level of the adder 73, i.e. when the errors between the provisionally decoded data E' and G', when the first predicted values H and J are used, and the original data E and G are smaller than the errors between the provisionally decoded data E" and G", when the second predicted values I and K are used, and the original data E and G, and on the other hand an output of "1", when the output level of the adder 72 is higher than the output level of the adder 73, i.e. when the errors between the provisionally decoded data E' and G', when the first predicted values H and J are used, and the original data E and G are greater than the errors between the provisionally decoded data E" and G", when the second predicted values I and K are used, and the original data E and G. This output is provided by the level comparator 74 as the flag through a terminal 98 and at the same time supplied to data selectors 75 and 76.

The first predicted values H and J and the second predicted values I and K are supplied to the data selectors 75 and 76. For example, when the flag Z from the level comparator 74 is "0", the first predicted values H and J are selected and outputted; that is, the first predicted value H as the predicted value for the data E is outputted as data L through a terminal 97 from the data selector 75 and the first predicted value J as the predicted value for the data G is outputted as data M through a terminal 99 from the data selector 76. On the contrary, when the flag Z from the level comparator 74 is "1", the second predicted values I and K are selected and outputted. That is, the second predicted value I as the predicted value for the data E is outputted as data L through the terminal 97 from the data selector 75 and the second predicted value K as the predicted value for the data G is outputted as the data M through the terminal 99 from the data selector 76.

The output data from the predicted value selecting circuit outputted through the terminals 97, 99 and 98, i.e. the predicted values L and M and the flag Z are supplied to the subtracters 10 and 13 and to the flag adding circuit 15, respectively, in FIG. 23, and the coding processing stated above is carried out there.

Figure 30:
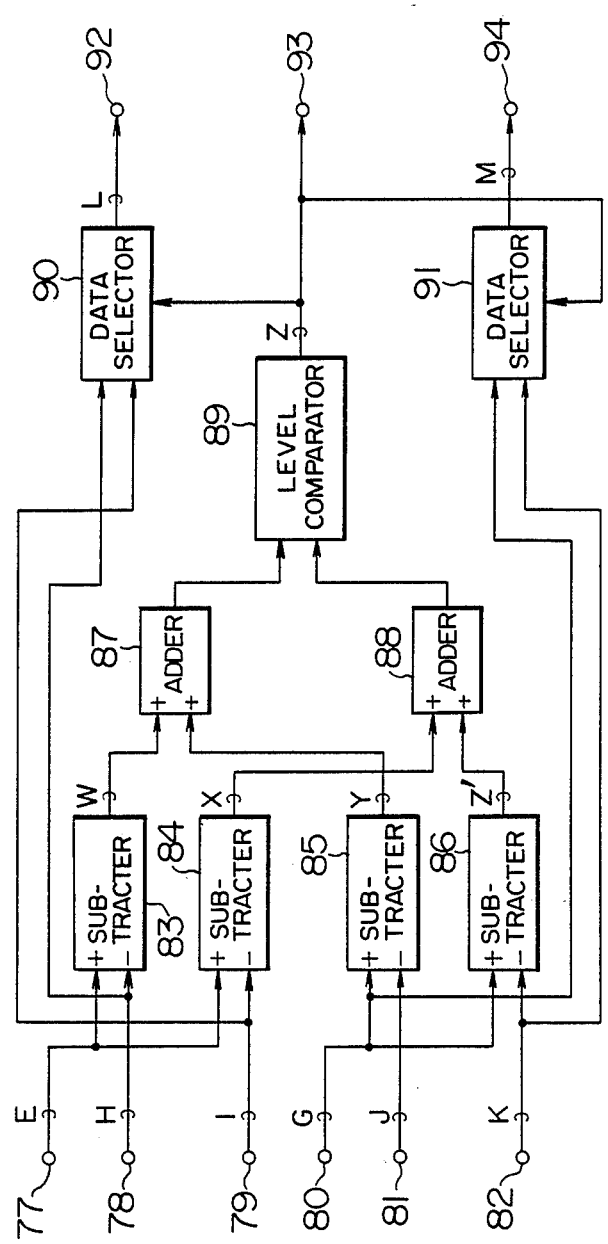
FIG. 30 is a block diagram illustrating another specific example of the predicted value selecting circuit of FIG. 23.

Next another concrete example of the predicted value selecting circuit 11 in FIG. 23 will be explained below, referring to FIG. 30.

Usually, if a predicted value is used for which the difference between the predicted value and the original sampled data, i.e. the predicted error, is small, errors between data compressed and decoded by using that predicted value and the original sampled data are also small. Therefore, as indicated in FIG. 30, differences between the original sampled data E and G, inputted through terminals 77 and 80, and the first predicted values H and J for the data E and G, inputted through terminals 78 and 81, and differences between the original sample data E and G, inputted through terminals 77 and 80, and the second predicted values I and K for the data E and G inputted through terminals 79 and 82, i.e. predicted errors for these predicted values, are calculated by subtracters 83 and 85 and subtracters 84 and 86, respectively.

The predicted errors W and Y for the first predicted values H and J, which are output data from the subtracters 83 and 85, are added to each other in an adder 87. At the same time the predicted errors X and Z' for the second predicted values I and K, which are output data from the subtracters 84 and 86, are added to each other in an adder 88. The level of the predicted error obtained by using the first predicted value, which is the output of the adder 87, and that of the predicted error obtained by using the second predicted value, which is the output of the adder 88, are compared with each other by a level comparator 89. Level comparator 89 gives an output which, for example can be "0", when the predicted errors obtained by using the first predicted value are smaller than the predicted errors obtained by using the second predicted value and, on the contrary, can be "1" when the predicted errors obtained by using the first predicted value are greater than the predicted errors obtained by using the second predicted value. This output from the level comparator 89 is provided as the flag Z through a terminal 93 and at the same time is supplied to data selectors 90 and 91.

The first predicated values H and J and the second predicted values I and K are supplied to the data selectors 90 and 91, respectively. For example the first predicted values H and J, when the flag Z is "0", and the second predicted values I and K, when the flag Z is "1", are selected and outputted by the data selector 90 and 91 as data L and M through terminals 92 and 94, respectively.

The output data from the predicted value selecting circuit, which are outputted through the terminals 92 and 94 as well as through the terminal 93, i.e. the predicted values L and M and the flag Z, are supplied to the subtracters 10 and 13 and the flag adding circuit 15, respectively, as indicated in FIG. 23, to be coded there as described previously.

As explained above, this invention is characterized in that one sample is coded as the reference sample for every N samples, with a sufficiently great number of bits n so that quantization errors are negligibly small, and for the other samples the predicted value, for which errors with respect to the original sample data at the decoding are the smallest, is selected, and the difference between the predicted value and the original sampled data is coded with a number of bits m, which is smaller than n stated above. In this way the number of bits of transmitted or recorded/reproduced data and the transmission rate can be reduced by a factor of $\{(n+1)+(N-1)\times m\}/N\times n$ with respect to that required by the prior art method, by which all the samples are coded with the number of bits n.

Further, according to this invention, the compression in number of bits and the extension process, which is inverse thereto, are all carried out for every group consisting of N samples. In addition, as is clear from the preceding embodiments, since in any case there is no feedback loop, but all the devices are constructed by the feed forward formalism, influences of quantization noise and coding errors are not exerted successively on the following coding, but these influences can be kept to the minimum.

Although, in the above embodiments, cases where this invention is applied to a magnetic recording/reproducing device such as VTR have been shown, this invention is not restricted thereto, but it is a matter of course that it can be applied to all the cases where video signals are transmitted in the state of digital signals as in a so-called digital television receiver, etc.

Figure 31:
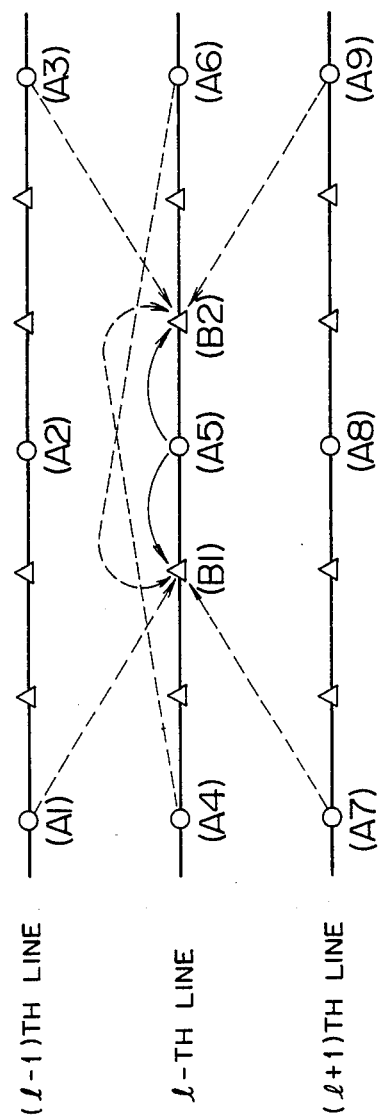
FIG. 31 shows waveforms for explaining the principle of operation of another specific example of the predicted value calculating circuit.

Further, although, in the above embodiments cases where a reference sample which is adjacent to a relevant sample within the same line, and a reference sample which is distant by four samples therefrom and has the same phase of the color subcarrier are used as predicted values, as indicated in FIGS. 25A and 25B, this invention is not restricted thereto, but it can be applied as well to the case where the predicted value is calculated on the basis of reference samples in two adjacent lines. That is, this invention is valid also in the case illustrated in FIG. 31 where first predicted values for both samples B1 and B2, which are to be compressed and coded and indicated by a mark $\Delta$, in the l-th line are supposed to be a reference sample A5 indicated by a mark o within the l-th line; a second predicted value C1 for the sample B1 is calculated, e.g. according to $C1=(A1+A6+A7)/3$, by using a reference sample A1 within the (l−1)th line, a reference sample A6 within the l-th line and a reference sample A7 within the (l+1)th line having the same phase of the color subcarrier as that of the sample B1; and a second predicted value C2 for the sample B2 is calculated e.g. according to $C2=(A3+A4+A9)/3$, by using a reference sample A3 within the (l-1)th line, a reference sample A4 within the l-th line and a reference sample A9 within the (l+1)th line. Furthermore this invention can be applied also to the case where the predicted value is calculated on the basis of reference samples in the adjacent fields or the adjacent frames.

Although, in the above embodiments, the case where successive N samples were brought together in one set and for all the remaining samples among these N samples excluding a sample which was the reference sample, either the difference between the first predicted value of each of them and the reference sample was compressed and coed or the difference between the second predicted value of each of them and the reference sample was compressed and coded, was shown, this invention is not restricted thereto, but it can be applied as well to the case where the first or the second predicted value is selected individually for each of the remaining samples and the difference between the selected predicted value and the reference sample is compressed and coded. In this case it is sufficient to add a flag indicating which predicted value has been selected for each of the samples to be compressed and coded thereto, which does not deviate from the scope of this invention.

Further, although, in the above embodiments, the case where two kinds of predicted values were calculated for every sample to be compressed and coded were shown, this invention is not restricted thereto, but it can be applied as well to the case where more than two kinds of predicted values are calculated for every sample to be compressed and coded. In this case it is sufficient to increase the number of bits required by the flag indicating which predicted value has been selected for each of the samples, which does not deviate from the scope of this invention.

Furthermore, although, in the above embodiments, the case where N successive samples were brought together in one set and for all the remaining N−1 samples among these N samples excluding a sample which was the reference sample, the difference between a predicted value for all of them and the sample was compressed and coded, was shown, this invention is not restricted thereto, but it can be applied as well to the case where at least one of the N−1 samples excluding the reference sample, is not coded and the other samples are compressed and coded.

That is, as indicated in FIG. 32, a sample $A_{3i}$, $A_{3i+3}$ indicated by a mark o for every 3 samples is the reference sample, which is coded with n (=7) bits; a sample $A_{3i-1}$, $A_{3i+2}$ indicated by a mark x is not coded; and for the other samples $A_{3i-2}$, $A_{3i+1}$, $A_{3i+4}$, each indicated by a mark Δ the difference between the predicted value therefor and the original sample is compressed and coded. Here the sample indicated by the mark x, which is neither compressed nor coded, is interpolated during the decoding, e.g. by using the average value of the extrapolated values obtained from the samples which are adjacent on both the sides and the samples which are adjacent but one on both the sides, i.e. predicted value $B_{3i+2}$ for $A_{3i+2}$;

$$B_{3i+2} = \frac{(2A_{3i+1} - A_{3i}) + (2A_{3i+3} - A_{3i+4})}{2}$$

In this case the first and the second predicted values are calculated for the sample indicated by a mark Δ; a predicted value is selected at the coding for every sample indicated by the mark Δ on the basis of a provisional decoding or predicted errors similar to those described in the above embodiments; and a flag indicating the result of the selection is transmitted for every sample. Consequently each of the data can be expressed by a code, whose number of bits corresponds to (0, n+1, m). In this way it is possible to decrease the number of bits and the transmission rate of the data transmitted or recorded/reproduced to {(n+1)+m}/3×n with respect to those required by the prior art method, by which all the samples are coded with a number of bits n.

As explained above, also according to such a method, the coding process is effected while switching over the predicted values for every sample to be compressed and coded, which doesn't deviate from the scope of this invention. Further it is obvious that this invention can be applied also to the case where the predicted value is selected not only on the basis of the provisionally decoded data of the sample to be compressed and coded but also on the basis of both the provisionally decoded data and the interpolated value for the sample, which is not coded, obtained by using the provisionally decoded data and the reference sample.

Further, although, in the above embodiments, the case where a flag indicating which predicted value had been selected was shown, this invention is not restricted thereto, but it can be applied as well to the case where no flag indicating the predicted value is transmitted.

Figure 33:
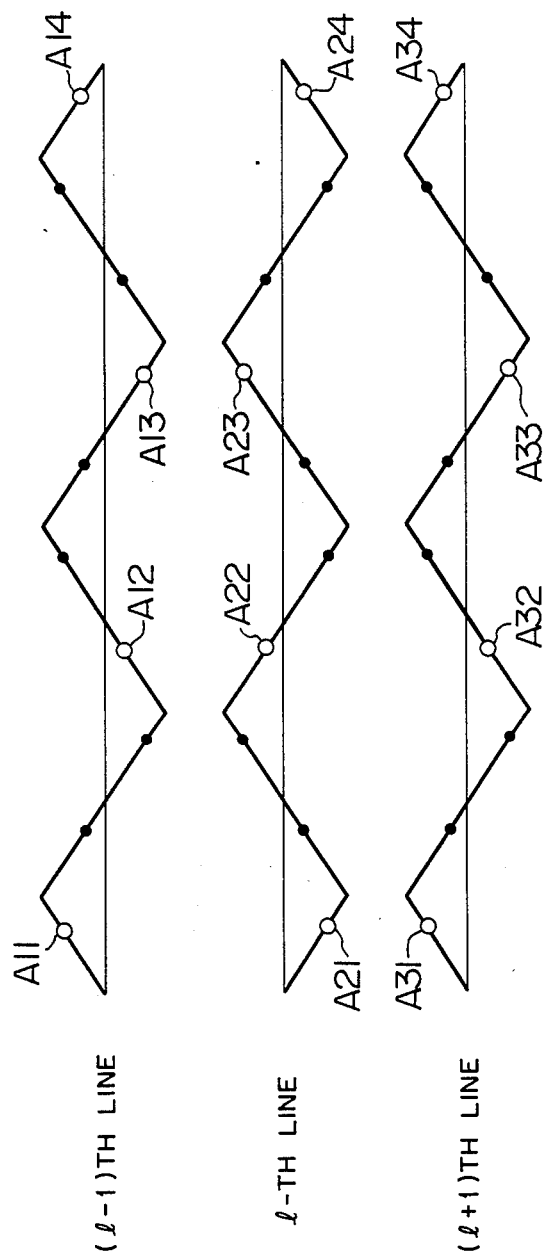
FIG. 33 shows waveforms for explaining the principle of operation of still another embodiment of this invention.

That is, as shown by the sample indicated by a mark o in FIG. 33, when the sampling is effected so that reference samples are located at the same sampling position on different lines (or different fields or frames), since the phases of two reference samples in adjacent lines (or adjacent fields or frames) are inverse with respect to each other, in the case where a differential operation is effected therebetween, e.g. $A_{2M} - A_{1M}$ (M being an integer) in FIG. 33 is formed, the differential output is higher than a predetermined level, it is determined that it is a signal having a high degree of color saturation, and a predicted value is selected from reference samples having the same phase of the color subcarrier, which are close to the relevant reference sample. On the other hand, in the case where the differential output is lower than the predetermined level, it is judged that it is a signal having a low degree of color saturation, and a predicted value is selected from reference samples which ar closest to the relevant reference sample. In this way the compressing and coding is effected by selecting either one of these two predicted values. Also at the decoding it is possible to select the predicted value in the same way. This case also does not deviate from the scope of this invention. In addition, the differential operation may be effected between reference samples which are close to each other on the same line and in opposite phase.

As explained above, according to this invention, it is possible to decrease the amount of information of signals without deteriorating the video signal to be transmitted or with small effect of error, even if they are produced, and further without producing any error propagation due to accumulation of quantization noise or coding errors, and accordingly the transmission rate can be lowered. Consequently in a magnetic recording-/reproducing device such as a digital VTR it is possible to increase substantially the recording density on the tape and to secure a sufficient working speed of the hardware can be reduced, which facilitates its fabrication by using ICs, lowers the cost of the device, and increases its reliability.

We claim:

1. A coding device, which transmits digital signals consisting of sampled data obtained by sampling and quantizing an analogue video signal with a number of quantization bits n after having compressed and coded the digital signals, comprising:

group finishing means for forming one group for every N sampled data, N being an integer greater than two;

reference sampled data setting means for setting one of the N sampled data as a reference sampled data for each of the groups formed by said group forming means;

difference calculating means for calculating the difference between at least one of the remaining sampled data in each of said groups and the reference sampled data;

compressing and coding means for coding the difference obtained by said difference calculating means with a number of bits smaller in number than the number of quantization bits n; and a data selector for outputting at least the reference sampled data from said reference sampled data setting means and coded differential data from said compressing and coding means as time sequential digital data.

2. A coding device according to claim 1, wherein said difference calculating means calculates the differences between all of the remaining sampled data and the reference sampled data.

3. A coding device according to claim 1, wherein said compressing and coding means codes all the differences coming from said difference calculating means.

4. A coding device according to claim 1, further comprising:
  predicted value generating means for generating at least two predicted values on the basis of the reference sampled data for at least one among the remaining sampled data;
  means for selecting one of the generated predicted values for which the difference between each of them and the sampled data corresponding to it is smaller; and
  coding means for representing the sampled data corresponding to the selected predicted value by a constituted by a number of bits smaller in number than the number of bits constituting the reference sampled data, on the basis of the differential data between the selected predicted value and the corresponding sampled data.

5. A coding device, which transmits digital signals consisting of sampled data obtained by sampling and quantizing an analogue video signal with a number of quantization bits n after having compressed and coded the digital signals, comprising:
  group forming means for forming one group for every N sampled data, N being an integer greater than two;
  reference sampled data setting means for setting one of the N sampled data as a reference sampled data for each of the groups formed by said group forming means;
  predicted value forming means for forming a predicted value for at least one of the remaining sampled data in each of said groups;
  difference calculating means for calculating the difference between the predicted data coming from said predicted value forming means and the at least one of the remaining sampled data;
  compressing and coding means for coding the difference obtained by said difference calculating means with a number of bits smaller in number than the number of quantization bits n; and
  a data selector for outputting at least the reference sampled data from said reference sampled data setting means and coded differential data from said compressing and coding means as time sequential digital data.

6. A coding device according to claim 5, further comprising:
  means for preventing the supplying of at least one of the sampled data to said data selector so that it is not coded when N is an integer greater than three.

7. A coding device according to claim 5, further comprising:
  predicted value generating means for generating at least two predicted values on the basis of the reference sampled data for at least one among the remaining sampled data;
  means for selecting one of the generated predicted values, for which the difference between each of them and the sampled data corresponding to it is smaller; and
  coding means for representing the sampled data corresponding to the selected predicted value by a code constituted by a number of bits smaller in number than the number of bits constituting the reference sampled data, on the basis of the differential data between the selected predicted value and the corresponding sampled data.

8. A coding device according to claim 7, wherein said predicted value generating means is so constructed that the generated predicted values are the value of the reference sampled data closest in time or in distance to the sampled data to be compressed and coded within the same line and the value of the reference sampled data having the same phase of the color subcarrier as that of the sampled data to be compressed and coded and which are the closest in time or in distance to the sampled data.

9. A coding device according to claim 7, wherein the frequency of sampling and quantizing the video signal is four times as great as the frequency of the color subcarrier in the video signal, said coding device further comprising:
  means for selecting the reference sampled data for every N=3 samples; and
  means for setting the value of the reference sampled data adjacent to the remaining sampled data within the same line and the value of the reference sampled data having the same phase of the color subcarrier as that of the remaining sampled data and which are distant by four samples from the remaining sampled data, as two predicted values corresponding to each of the remaining sampled data other than the reference sampled data.

10. A coding device according to claim 7, further comprising:
  means for generating a flag indicating the result of the selection of the generated predicted values and supplying the flag to said data selector.

11. A coding device according to claim 7, wherein said predicted value selecting means comprises:
  means for transforming data obtained by compressing and coding each of the at least two generated predicted values into data having the same number of bits as that of the differential data on the basis of the transformed data;
  means for adding the generated predicted value to the transformed data; and
  means for comparing the level of the result obtained by said adding means with the level of the original sampled data which are to be compressed and coded.

12. A coding device according to claim 7, wherein said predicted value selecting means is composed of:
  means for comparing the levels of predicted errors between each of the at least two generated predicted values and the original sampled data which are to be compressed and coded.

13. A coding device according to claim 7, wherein said predicted value generating means comprises:
  means for generating predicted values based on more than one of the reference sampled data, which are close to the sampled data to be compressed and coded, within the horizontal scanning line including the sampled data to be compressed and coded, and M lines before and behind the horizontal scanning line, M being an integer greater than two; and
  means for generating a predicted value on the basis of more than one of the reference sampled data having the same phase of the subcarrier as that of the sampled data to be compressed and coded, within the horizontal scanning line including the sampled data to be compressed and coded, and M lines before and behind the horizontal scanning line.

14. A coding device according to claim 7, wherein said predicted value generating means comprises:
    means for generating predicted values based on more than one of the reference sampled data close to the sampled data to be compressed and coded, within the same field as that including the sampled data to be compressed and coded, and M fields before and behind the field, M being an integer greater than two; and
    means for generating a predicted value on the basis of more than one of the reference sampled data having the same phase of the subcarrier as that of the sampled data to be compressed and coded, within the same field as that including the sampled data to be compressed and coded, and M fields before and behind the field.

15. A coding device according to claim 7, wherein said predicted value generating means is composed of:
    means for transforming compressed and coded data into data having a number of bits, which is equal to that of the differential data, on the basis of the compressed and coded data as the at least two generated predicted values;
    means for adding the generated predicted values to the transformed differential data having the number of bits n;
    means for calculating an interpolated value corresponding to the non-coded sampled data;
    means for calculating the difference between the result of said adding means and the original sampled data to be compressed and coded; and
    means for calculating the difference between the original sampled data of the non-coded sampled data and the interpolated value obtained by each of the generated predicted values.

16. A coding device according to claim 7, wherein the frequency for sampling and quantizing the video signal is four times as great as the frequency of the color subcarrier in the video signal; said device further comprising:
    means for coding one of N=3 sampled with a number of bits n as the reference sampled data, one of the sampled data adjacent to the reference sampled data on one side being not coded, and the other sampled data adjacent to the reference sampled data being compressed and coded on the basis of the difference between the generated predicted value and the original sampled data; and
    said predicted value generating means includes:
    means for adopting the value of the reference sampled data adjacent to the sampled data to be compressed and coded and within the same line, and the value of the reference sampled data distant by four samples from the sampled data to be compressed and coded within the same line, and has the same phase of color subcarrier as that of the sampled data to be compressed and coded.

17. A coding device according to claim 1, further comprising:
    means for preventing the supplying of at least one of the sampled data to said data selector as that it is not coded when N is an integer greater than three.

18. A coding device according to claim 6 to 17, wherein the analogue video signal is a composite video signal and the N sampled are pixels brought together in a group for every color subcarrier period among the pixels successively coded.

19. A coding device according to claim 6 to 17, further comprising:
    calculating means for obtaining an average value of the coded sampled data, which are adjacent or adjacent but one to the non-coded sampled data on both the sides, the non-coded sampled data being obtained by interpolation based on the average value.

20. A coding device according to claim 6 to 17, further comprising:
    calculating means for obtaining a plurality of interpolated values based on two coded sampled data, which are adjacent and adjacent but one, respectively, to the non-coded sampled data on both the sides as an optimum interpolation method, the optimum interpolation method being an interpolation method for obtaining an interpolation value at which an error between an original sampled value, which is not coded, and the interpolation value is a minimum; and
    means for selecting the optimum value between the two interpolated values obtained when said calculating means generates a flag indicating the selected interpolated value.

21. A coding device according to claim 6 or 17, further comprising:
    means for locating the sampled data among the N sampled data so as to be adjacent to the reference sampled data.

22. A coding device according to claim 6 or 17, further comprising:
    means for setting the N sampled data so that the sampled data adjacent to the sampled data, which are not coded, on both sides are either the reference sampled data or compressed and coded data in a series of data, in which sets of the N sampled data are arranged successively.

23. A coding device according to claim 6 or 17, further comprising:
    means for setting the N sampled data so that at least one of the sampled data adjacent to the sampled data, which are compressed and coded, on both sides is either the reference sampled data or compressed and coded data in a series of data, in which sets of the N sampled data are arranged successively.

24. A coding device according to claim 6, further comprising:
    means for outputting the sampled data after thinning out thereof so that coded sampled data to be transmitted or recorded in different image signal lines for every M image signal lines combined according to a predetermined rule have numbers from 1 to N, which are different for different lines, where M is an integer greater than one.

25. A coding device according to claim 6, further comprising:
    means for assigning an increasing number of coding bits for compressing and coding the difference between different sampled data among N sampled data combined according to a predetermined rule and the predicted value obtained on the basis of the reference sampled data with increasing distance from the reference sampled data.

26. A coding device according to claim 6, further comprising:
means for generating a flag indicating an optimum interpolation method for the sampled data which are not coded, and supplying it to said data selector, the optimum interpolation method being an interpolation method for obtaining an interpolation value at which an error between an original sampled value, which is not coded, and the interpolation value is a minimum.

27. A coding device according to claim 6, further comprising:
calculating means for assigning an increasing number of coding bit for compressing and coding the difference between different sampled data among N sampled data and the predicted value obtained on the basis of the reference sampled data with decreasing distance from the non-coded sample data.

28. A coding device according to claim 24, wherein the predetermined M image signal lines are image signal which are adjacent to each other in the same image field.

29. A coding device according to claim 24, wherein the predetermined M image signal lines are image lines which are adjacent but one in same image field.

30. A coding device according to claim 24, wherein the predetermined M image signal lines are image signal lines which are adjacent to each other in two image fields which are adjacent to each other.

31. A coding device according to claim 24, wherein the predetermined M image signal lines are image signal lines which are the same lines in two image fields which are adjacent but one.

32. A coding device according to claim 24 wherein the predetermined M image signal lines are image signal lines which are the same lines in two image fields which are adjacent to each other.

33. A coding device according to claim 32, wherein the position of the pixel, where successive sampling for every image signal line is started, is different for two fields which are adjacent to each other.

34. A coding device according to claim 29, wherein the position of the pixel, where successive sampling for every image signal line is started, is different for two lines which are adjacent to each other in a same field.

35. A coding device according to claim 29, wherein the position of the pixel, where successive sampling for every image signal line is started, is different for two fields which are adjacent to each other and for two lines which are adjacent to each other in the same field.

36. A coding device according to claim 24, wherein the number of image signal lines M is 2.

* * * * *